US009642134B2

(12) United States Patent
Sawai

(10) Patent No.: US 9,642,134 B2
(45) Date of Patent: May 2, 2017

(54) COMMUNICATION CONTROL DEVICE, COMMUNICATION CONTROL METHOD, AND COMMUNICATION DEVICE

(71) Applicant: SONY CORPORATION, Tokyo (JP)

(72) Inventor: Ryo Sawai, Tokyo (JP)

(73) Assignee: SONY CORPORATION, Tokyo (JP)

(*) Notice: Subject to any disclaimer, the term of this patent is extended or adjusted under 35 U.S.C. 154(b) by 98 days.

(21) Appl. No.: 14/758,926

(22) PCT Filed: Dec. 2, 2013

(86) PCT No.: PCT/JP2013/082397
§ 371 (c)(1),
(2) Date: Jul. 1, 2015

(87) PCT Pub. No.: WO2014/136333
PCT Pub. Date: Sep. 12, 2014

(65) Prior Publication Data
US 2015/0358963 A1 Dec. 10, 2015

(30) Foreign Application Priority Data

Mar. 7, 2013 (JP) .................................. 2013-045132

(51) Int. Cl.
H04J 3/00 (2006.01)
H04W 72/04 (2009.01)
(Continued)

(52) U.S. Cl.
CPC ........ *H04W 72/0446* (2013.01); *H04B 15/00* (2013.01); *H04W 4/005* (2013.01); *H04W 16/14* (2013.01); *H04W 72/1231* (2013.01)

(58) Field of Classification Search
CPC .............................. H04W 72/04; H04L 5/0073
See application file for complete search history.

(56) References Cited

U.S. PATENT DOCUMENTS

2013/0044651 A1* 2/2013 Wang ................ H04W 72/0406
370/280
2013/0064146 A1* 3/2013 Ahn .................... H04W 76/023
370/280
(Continued)

FOREIGN PATENT DOCUMENTS

JP 2010-28334 2/2010
WO WO 2012/113131 A1 8/2012
(Continued)

OTHER PUBLICATIONS

Partial European Search Report issued Sep. 12, 2016 in Patent Application No. 13876968.2.
(Continued)

*Primary Examiner* — Shaq Taha
(74) *Attorney, Agent, or Firm* — Oblon, McClelland, Maier & Neustadt, L.L.P.

(57) ABSTRACT

There is provided a communication control device that controls wireless communication in compliance with a time division duplex (TDD) scheme, the communication control device including: a selection unit configured to select a link direction configuration for the wireless communication among a plurality of candidates for the link direction configuration which indicates a link direction in units of sub-frames of a radio frame which includes a plurality of sub-frames; and an application unit configured to apply the selected link direction configuration to the wireless communication. The plurality of candidates include at least one of a link direction configuration dedicated to a downlink and a link direction configuration dedicated to an uplink.

18 Claims, 26 Drawing Sheets

(51) Int. Cl.
*H04B 15/00* (2006.01)
*H04W 4/00* (2009.01)
*H04W 16/14* (2009.01)
*H04W 72/12* (2009.01)

(56) References Cited

U.S. PATENT DOCUMENTS

| | | | |
|---|---|---|---|
| 2013/0336177 A1* | 12/2013 | Gao | H04W 72/0446 370/280 |
| 2014/0050177 A1* | 2/2014 | Takano | H04L 5/0032 370/329 |
| 2014/0177492 A1 | 6/2014 | Sun et al. | |
| 2014/0219255 A1* | 8/2014 | Eyuboglu | H04W 72/12 370/336 |
| 2015/0163036 A1* | 6/2015 | Thomas | H04L 5/0044 370/281 |

FOREIGN PATENT DOCUMENTS

| | | |
|---|---|---|
| WO | WO 2012/165067 A1 | 12/2012 |
| WO | WO 2013/024335 A2 | 2/2013 |

OTHER PUBLICATIONS

ECC Report 185, Complementary Report to ECC Report 159, "Further Definition of Technical and Operational Requirements for the Operation of White Space Devices in the Band 470-790 MHz", CEPT Electronic Communications Committee, Jan. 29, 2013, 150 pages.
"Reconfigurable Radio Systems (RRS); System Requirements for Operation in UHF TV Band White Spaces", Draft ETSI TS 102 946 V0.0.154 (Jun. 2011), European Telecommunications Standards Institute, Jun. 2011, 25 pages.
ECC Report 159, "Technical and Operational Requirements for the Possible Operation of Cognitive Radio Systems in the 'White Spaces' of the Frequency Band 470-790 MHz", Electronic Communications Committee (ECC) within the European Conference of Postal and Telecommunications Administrations (CEPT), Jan. 2011, 160 pages.
Naotaka Sato, "TV White Space as Part of the Future Spectrum Landscape for Wireless Communications", ETSI Workshop on Reconfigurable Radio Systems, Dec. 12, 2012, 21 pages.
Extended European Search Report issued Dec. 15. 2016 in Patent Application No. 13876968.2.
NPL Filed Jan. 12, 2017.

* cited by examiner

FIG. 1

| | #0 D | #1 S | #2 U | #3 U | #4 U | #5 D | #6 S | #7 U | #8 U | #9 U |
|---|---|---|---|---|---|---|---|---|---|---|
| Configuration 0 DL:UL 2:3 | #0 D | #1 S | #2 U | #3 U | #4 U | #5 D | #6 S | #7 U | #8 U | #9 U |
| Configuration 1 DL:UL 3:2 | #0 D | #1 S | #2 U | #3 U | #4 D | #5 D | #6 S | #7 U | #8 U | #9 D |
| Configuration 2 DL:UL 4:1 | #0 D | #1 S | #2 U | #3 D | #4 D | #5 D | #6 S | #7 U | #8 D | #9 D |
| Configuration 3 DL:UL 7:3 | #0 D | #1 S | #2 U | #3 U | #4 U | #5 D | #6 D | #7 D | #8 D | #9 D |
| Configuration 4 DL:UL 4:1 | #0 D | #1 S | #2 U | #3 U | #4 D | #5 D | #6 D | #7 D | #8 D | #9 D |
| Configuration 5 DL:UL 9:1 | #0 D | #1 S | #2 U | #3 D | #4 D | #5 D | #6 D | #7 D | #8 D | #9 D |
| Configuration 6 DL:UL 1:1 | #0 D | #1 S | #2 U | #3 U | #4 U | #5 D | #6 S | #7 U | #8 U | #9 D |

FIG. 7

CONFIGRATION 8

CASE 1: #0 U, #1 U, #2 U, #3 U, #4 U, #5 U, #6 U, #7 U, #8 U, #9 U

CASE 2: #9 D, #0 U, #1 U, #2 U, #3 U, #4 U, #5 U, #6 U, #7 U, #8 U, #9 U

FIG. 11

| AVAILABLE TIME | CENTER FREQUENCY | BANDWIDTH | MAXIMUM EIRP | TRANSMISSION SPECTRUM MASK RELATED INFORMATION | RESTRICTION ON LINK DIRECTION (SELECTABLE CANDIDATE) |
|---|---|---|---|---|---|
| FROM T_f1' TO T_f1" | f1 | X_f1[Hz] | Y_f1 [W] or [dBm] | Type#1 or N/A | FDD uplink only |
| FROM T_f2' TO T_f2" | f2 | X_f2[Hz] | Y_f2 [W] or [dBm] | Type#2 | All |
| ... | ... | ... | ... | ... | ... |
| FROM T_fn' TO T_fn" | fn | X_fn[Hz] | Y_fn [W] or [dBm] | Type#n | FDD downlink only |

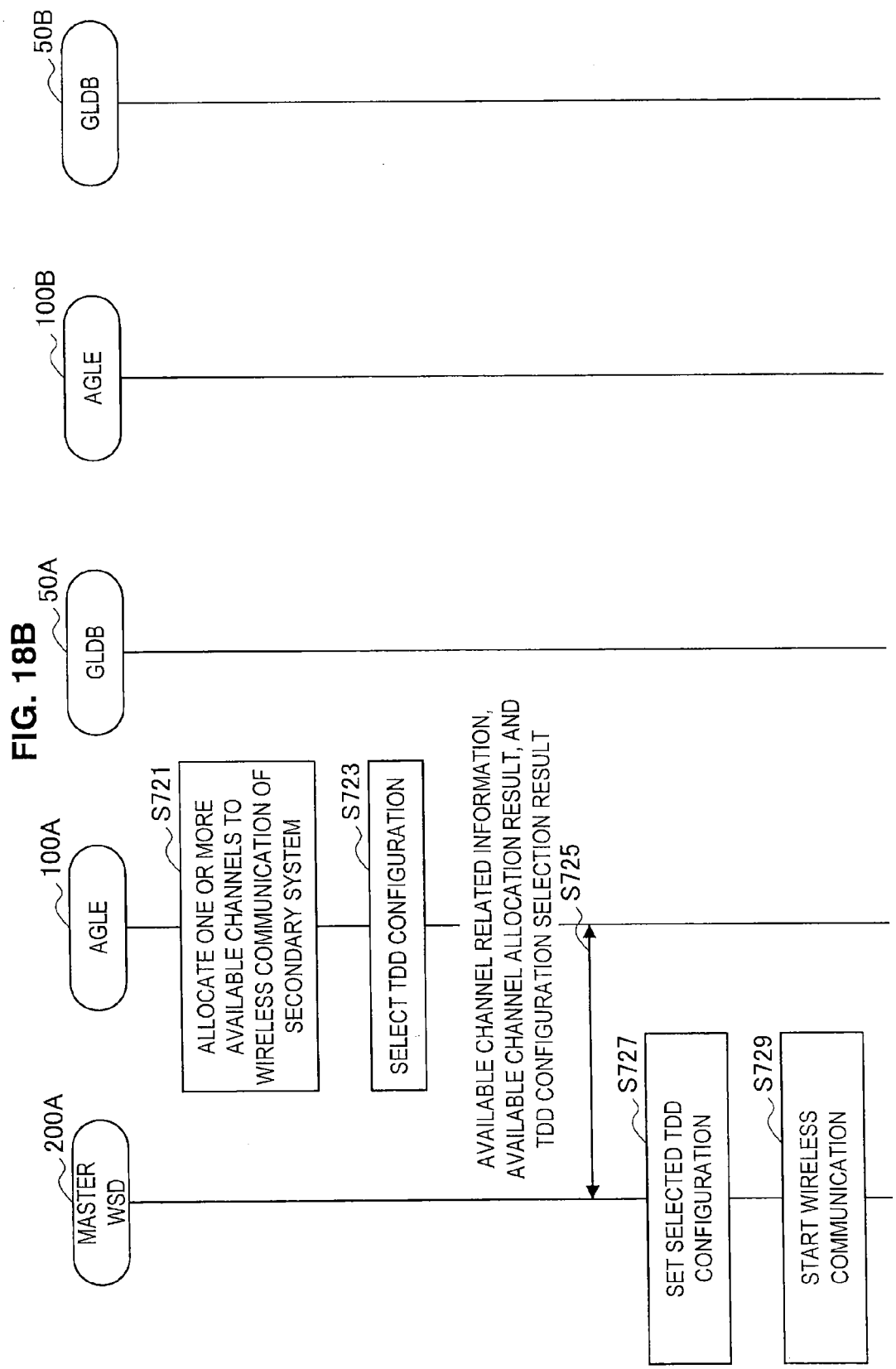

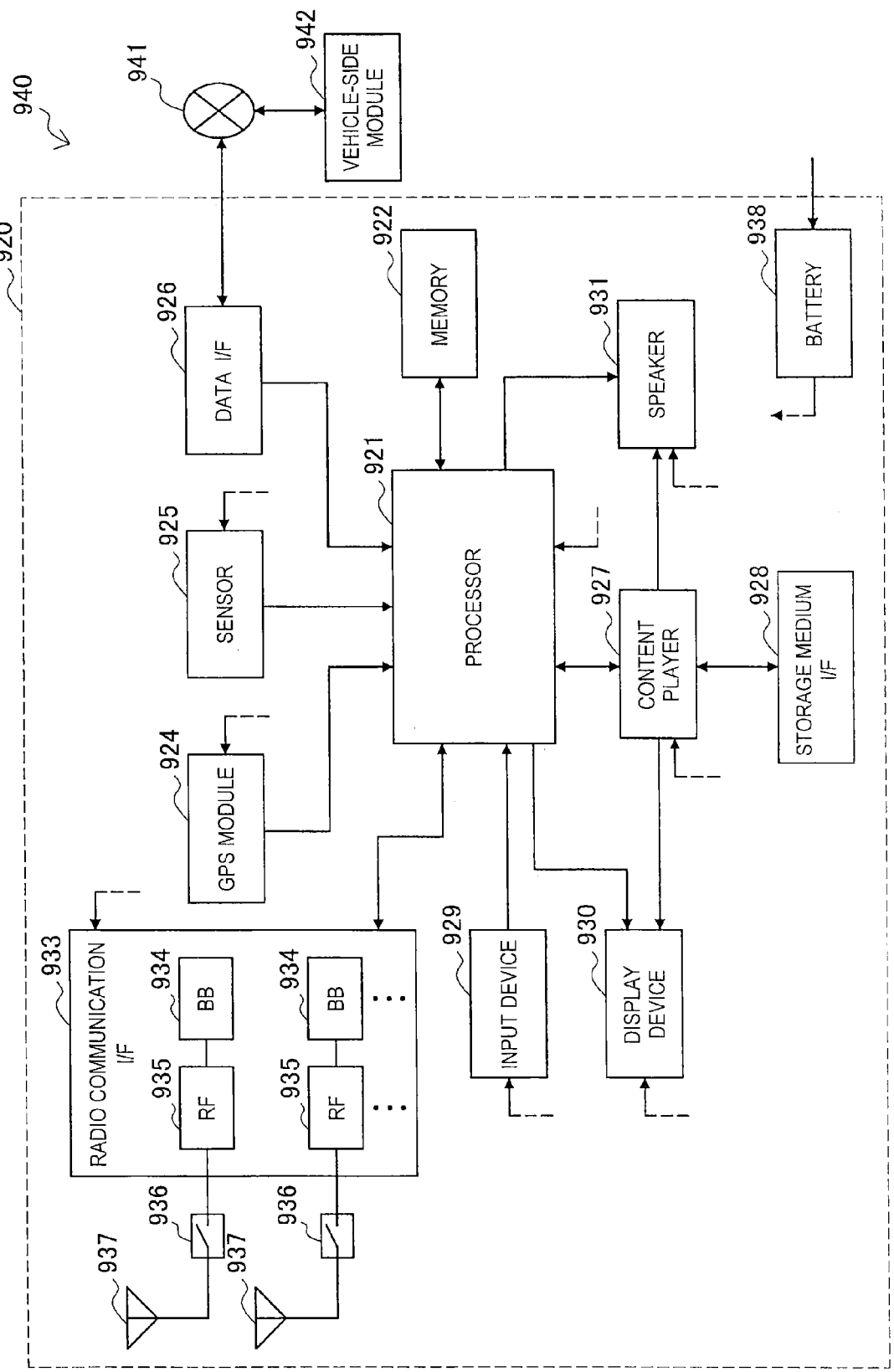

US 9,642,134 B2

COMMUNICATION CONTROL DEVICE, COMMUNICATION CONTROL METHOD, AND COMMUNICATION DEVICE

TECHNICAL FIELD

The present disclosure relates to a communication control device, a communication control method, and a communication device.

BACKGROUND ART

Wireless communication environments of recent years are facing the problem of depletion of frequency resources, which has been caused by soaring amounts of data traffic. Thus, active discussions have been exchanged with regard to a framework for opening frequency bands that were authorized for use by specific business operators but are not being used for secondary communication. The framework for secondary communication is referred to as Licensed Shared Access (LSA). For example, the European Conference of Postal and Telecommunications Administrations (CEPT) suggests technical requirements for devices that secondarily use so-called "TV white spaces" (White Space Devices, or WSDs) that are not being used for television broadcasting in Non-Patent Literature 1 below.

Generally, transmission power of a transmitter that uses a frequency band secondarily is restricted from causing unfavorable interference with a receiver of a primary system. For example, Non-Patent Literature 1 below proposes deployment of a geo-location database (GLDB) which provides information on the coverage of digital terrestrial television (DTT) systems that are primary systems, positions of DTT receivers, tolerable interference levels, and the like in order to appropriately control transmission power of a WSD. Since use of frequency bands is normally authorized by country (or region), a different GLDB may be deployed for each country (or region).

Non-Patent Literature 3 below proposes, for example, a country or a third party installing an advanced geo-location engine (AGLE) which uses information provided from a GLDB for maximizing a system capacity of a secondary system through more advanced calculation. The frequency managing agent of the UK, the Office of Communications (OfCom), and a third party database provider have decided to employ the approach of installing an AGLE.

In addition, in Non-Patent Literature 4 below, a technology of coexistence of devices which use a frequency band secondarily is discussed.

CITATION LIST

Non-Patent Literature

Non-Patent Literature 1: Electronic Communications Committee (ECC), "TECHNICAL AND OPERATIONAL REQUIREMENTS FOR THE POSSIBLE OPERATION OF COGNITIVE RADIO SYSTEMS IN THE 'WHITE SPACES' OF THE FREQUENCY BAND 470 TO 790 MHz," ECC REPORT 159, January 2011

Non-Patent Literature 2: Electronic Communications Committee (ECC), "Complementary Report to ECC Report 159; Further definition of technical and operational requirements for the operation of white space devices in the band 470 to 790 MHz," ECC REPORT 185, September 2012

Non-Patent Literature 3: Naotaka Sato (Sony Corporation), "TV WHITE SPACE AS PART OF THE FUTURE SPECTRUM LANDSCAPE FOR WIRELESS COMMUNICATIONS," ETSI Workshop on Reconfigurable Radio Systems, Dec. 12, 2012, Cannes (France)

Non-Patent Literature 4: Draft ETSI TS 102 946, Reconfigurable Radio Systems (RRS); System Requirements for Operation in UHF TV Band White Spaces

SUMMARY OF INVENTION

Technical Problem

However, influence of wireless communication of a primary system on wireless communication of a secondary system which secondarily uses a frequency band for the primary system has not been carefully considered. That is to say, influence of transmission power of a transmitter of a primary system on a receiver of a secondary system has not been carefully considered. For this reason, transmission power of the primary system can have significant influence on wireless communication of the secondary system. As a result, a decrease of the throughput of the secondary system is a concern. In addition, the same problem can arise not only in the secondary system with respect to TV white spaces but also in the case of a mobile communication system in which a small cell that is partly or entirely overlapped by a macro cell is disposed.

Thus, even when there are a transmitter and a receiver both using the same or close frequency bands, it is desirable to provide a framework in which more desirable wireless communication can be performed through the receiver.

Solution to Problem

According to the present disclosure, there is provided a communication control device that controls wireless communication in compliance with a time division duplex (TDD) scheme, the communication control device including: a selection unit configured to select a link direction configuration for the wireless communication among a plurality of candidates for the link direction configuration which indicates a link direction in units of sub-frames of a radio frame which includes a plurality of sub-frames; and an application unit configured to apply the selected link direction configuration to the wireless communication. The plurality of candidates include at least one of a link direction configuration dedicated to a downlink and a link direction configuration dedicated to an uplink.

According to the present disclosure, there is provided a communication control method for controlling wireless communication in compliance with a time division duplex (TDD) scheme, the communication control method including: selecting a link direction configuration for the wireless communication among a plurality of candidates for the link direction configuration which indicates a link direction in units of sub-frames of a radio frame which includes a plurality of sub-frames; and applying the selected link direction configuration to the wireless communication. The plurality of candidates include at least one of a link direction configuration dedicated to a downlink and a link direction configuration dedicated to an uplink.

According to the present disclosure, there is provided a communication control device including: a recognition unit configured to recognize a frequency channel on which wireless communication is performed in compliance with a time division duplex (TDD) scheme; and a decision unit configured to, when the wireless communication is performed on two or more frequency channels, decide one or more candidates selectable to be applied to wireless communication of each of the frequency channels among a plurality of candidates for a link direction configuration that indicates a link direction in units of sub-frames of a radio frame that includes a plurality of sub-frames for each of the frequency channels included in the two or more frequency channels, on the basis of information relating to the distance between an interference frequency channel on which an interference signal is transmitted and each of the frequency channels in a frequency direction. The plurality of candidates include at least one of a link direction configuration dedicated to a downlink and a link direction configuration dedicated to an uplink.

According to the present disclosure, there is provided a communication device that controls wireless communication in compliance with a time division duplex (TDD) scheme, the communication device including: a recognition unit configured to recognize a link direction configuration to be applied to the wireless communication among a plurality of candidates for the link direction configuration that indicates a link direction in units of sub-frames of a radio frame that includes a plurality of sub-frames; and a communication control unit configured to control the wireless communication in compliance with the recognized link direction configuration. The plurality of candidates include at least one of a link direction configuration dedicated to a downlink and a link direction configuration dedicated to an uplink.

Advantageous Effects of Invention

According to the present disclosure described above, even when there are a transmitter and a receiver both using the same or close frequency bands, more desirable wireless communication can be performed through the receiver.

BRIEF DESCRIPTION OF DRAWINGS

FIG. 1 is an illustrative diagram for describing specific examples of TDD configurations.

FIG. 7 is an illustrative diagram for describing TDD configurations dedicated to uplinks.

FIG. 11 is an illustrative diagram for describing an example of available channel related information to which information on selectable candidates is added.

FIG. 18B is a second sequence diagram illustrating an example of the schematic flow of the communication control process according to the third modified example of an embodiment.

FIG. 25 is a block diagram illustrating an example of a schematic configuration of a car navigation apparatus to which the technology according to the present disclosure can be applied.

DESCRIPTION OF EMBODIMENTS

Figure 2:
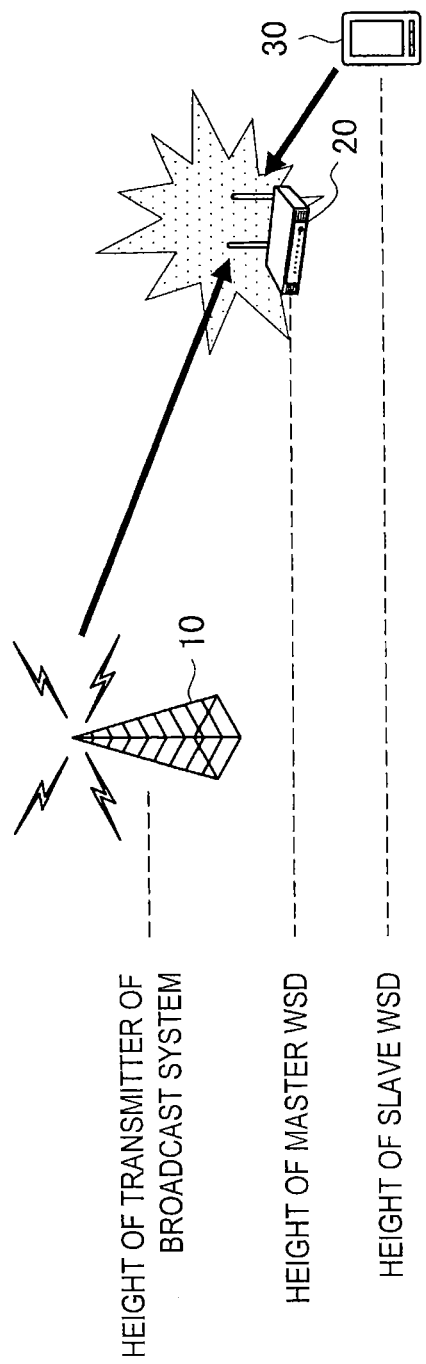
FIG. 2 is an illustrative diagram for describing an example of influence that transmission power of a primary system has on an uplink of a secondary system.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Description will be provided in the following order.

1. Introduction 1.1 Trend of a duplex scheme 1.2. Technical problem 1.3. New technique according to an embodiment 2. Schematic configuration of a communication system according to an embodiment 3. Configuration of each device
3.1. Configuration of an AGLE
3.2. Configuration of a master WSD
3.3. Configuration of a slave WSD
4. Flow of a process
5. Modified examples
5.1. First modified example
5.2. Second modified example
5.3. Third modified example
6. Application examples
6.1. Application example of an AGLE and a GLDB
6.2. Application example of a master WSD
6.3. Application example of a slave WSD
7. Conclusion

1. Introduction

First, a trend, a technical problem, and a new technique according to an embodiment with respect to a duplex scheme will be described.

1.1. Trend of a Duplex Scheme

As duplex schemes with respect to TV white spaces, frequency division duplex (FDD) or time division duplex (TDD) can be employed. In FDD, a frequency channel for an uplink and a frequency channel for a downlink are prepared separately, but in TDD, a frequency channel can be flexibly allocated to an uplink and a downlink.

In addition, the more flexible TDD is considered to be desirable as a duplex scheme with respect to the TV white spaces. More flexible allocation to an uplink and a downlink is favorable because a frequency channel used in a primary system depends on the states of channels at each location. It is also because a protocol that operates in carrier sense multiple access (CSMA) or time division multiple access (TDMA) based on TDD in super Wi-Fi (defined in IEEE 802.11af and IEEE 802.22) that is a dominant radio access technology (RAT) of WSDs is employed. In addition, active movements of using frequency bands secondarily through Time Division Long Term Evolution (TD-LTE) have recently appeared in Europe.

It should be noted that, in TDD, a plurality of sub-frames are included in a radio frame and a link direction (for example, a downlink or an uplink) is set in units of sub-frames. To be more specific, a plurality of candidates for a link direction configuration (i.e., TDD configuration) which indicates a link direction in units of sub-frames are prepared in a radio frame in advance. In addition, any candidate among the plurality of candidates is set. Specific examples of a plurality of candidates for a TDD configuration will be described below with reference to FIG. 1.

FIG. 1 is an illustrative diagram for describing the specific examples of TDD configurations. Referring to FIG. 1, 7 TDD configurations (Configurations 0 to 6) that are defined in the technical standard of $3^{rd}$ Generation Partnership Project (3GPP) (TS 36.211 Table 4.2-2: Uplink-downlink configuration) are shown. In the TDD configurations, each sub-frame is any of a downlink frame that is a sub-frame for a downlink, an uplink frame that is a sub-frame for an uplink, and a special sub-frame. Special sub-frames are provided at the time of switching of a downlink sub-frame and an uplink sub-frame in order to consider a propagation delay from a base station to a terminal device.

As illustrated in FIG. 1, each of the TDD configurations has a different ratio of the number of sub-frames for an uplink to the number of sub-frames for a downlink. For example, when the special sub-frames are considered as sub-frames for a downlink, the TDD configuration that has the maximum ratio of sub-frames for a downlink (i.e., the downlink sub-frames and the special sub-frames) to the total number of sub-frames is Configuration 5. The ratio of the sub-frames for a downlink of this case is nine out of ten. On the other hand, the TDD configuration that has the maximum ratio of sub-frames for an uplink to the total number of sub-frames is Configuration 0. The ratio of the sub-frames for an uplink (i.e., uplink sub-frames) in this case is six out of ten.

1.2. Technical Problem

In general, transmission power of a transmitter that uses a frequency band secondarily is restricted from causing unfavorable interference with a receiver of a primary system. However, influence of transmission power of a transmitter of a primary system on a receiver of a secondary system that secondarily uses a frequency band has not been carefully considered. For this reason, transmission power of a primary system can significantly influence a secondary system. Examples of the influence of transmission power of a primary system on a secondary system will be described below with reference to FIGS. 2, 3, and 4.

FIG. 2 is an illustrative diagram for describing an example of the influence that transmission power of a primary system has on an uplink of a secondary system. Referring to FIG. 2, a transmitter 10 of a broadcast system which is the primary system, and a master WSD 20 and a slave WSD 30 of the secondary system are illustrated. As illustrated in FIG. 2, the transmitter 10 of the broadcast system is normally installed at a very high position so that radio waves reach distant places. In addition, the master WSD 20 that serves as an access point or a base station is also installed at a higher position than the slave WSD 30. In this case, there is a high possibility of the propagation path from the transmitter 10 to the master WSD 20 being an estimated propagation path. Furthermore, transmission power of the transmitter 10 can be very high. For these reasons, the transmission power of the transmitter 10 can significantly influence the master WSD 20. That is to say, a transmission signal of the transmitter 10 can seriously interfere with an uplink signal that the master WSD 20 receives. In this manner, the transmission power of the primary system can have significant influence on the uplink of the secondary system.

Figure 3:
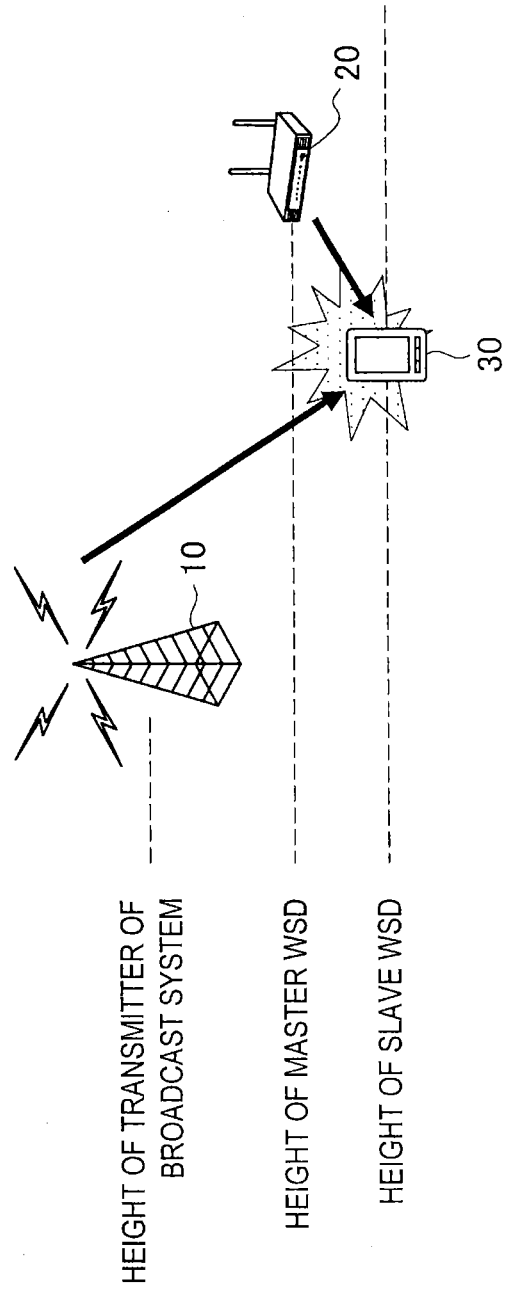
FIG. 3 is an illustrative diagram for describing an example of influence that transmission power of the primary system has on a downlink of the secondary system.

FIG. 3 is an illustrative diagram for describing an example of influence that the transmission power of the primary system has on a downlink of the secondary system. Referring to FIG. 3, the transmitter 10 of the broadcast system which is the primary system, and the master WSD 20 and the slave WSD 30 of the secondary system are illustrated as in FIG. 2. The transmitter 10 of the broadcast system is normally installed at a very high position and the master WSD 20 is installed at a higher position than the slave WSD 30 as described above. In this case, there is a high possibility of the propagation path from the transmitter 10 to the slave WSD 30 not being an estimated propagation path. For this reason, influence that transmission power of the transmitter 10 has on the slave WSD 30 is smaller than the influence that the transmission power of the transmitter 10 has on the master WSD 20. In this manner, the provision that the transmission power of the primary system gives to the downlink of the secondary system can be smaller than the influence that the transmission power of the primary system has on the uplink of the secondary system.

Figure 4:
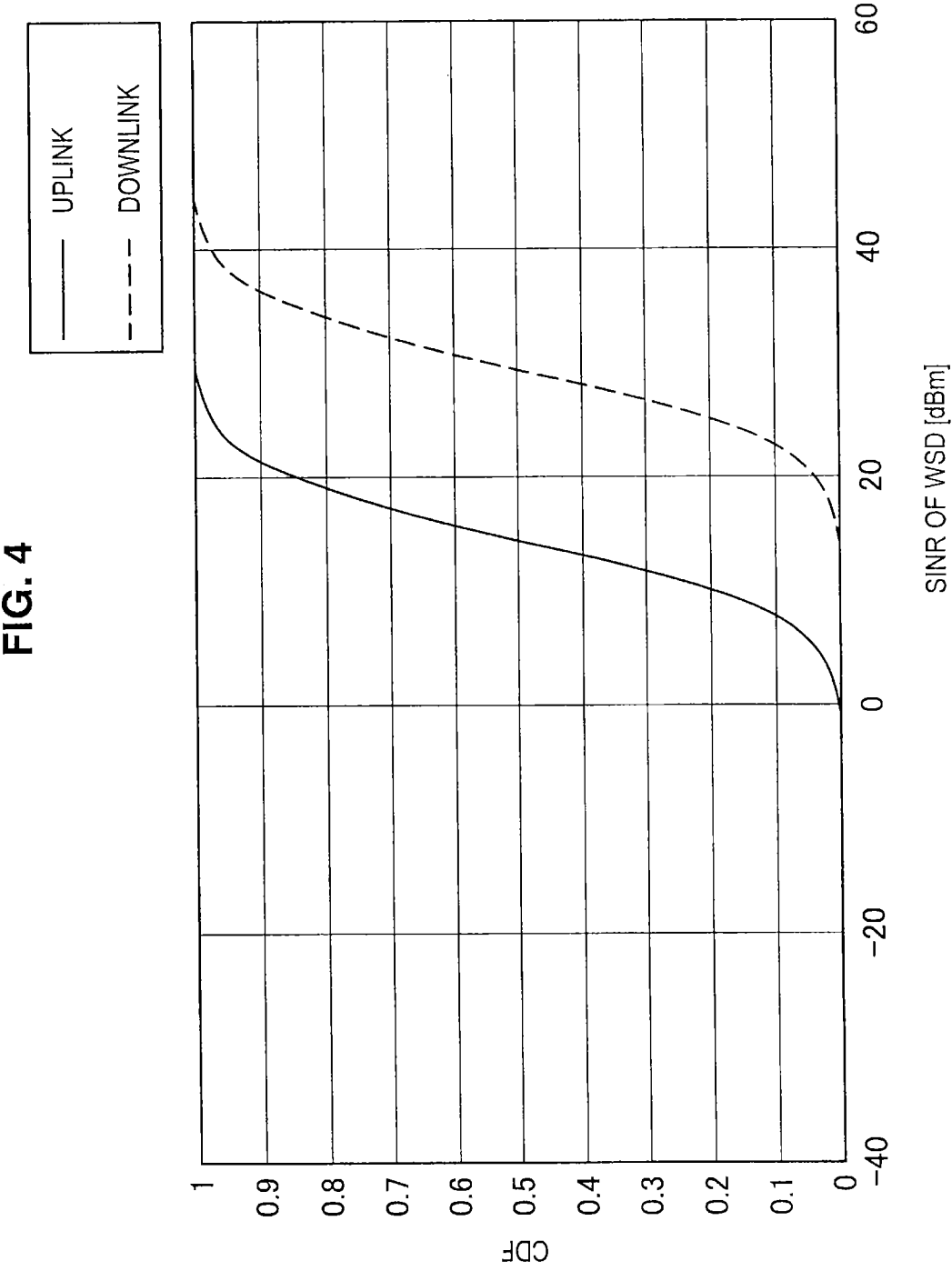
FIG. 4 is an illustrative diagram for describing an example of the comparison result of the SINR of an uplink and the SINR of a downlink of a WSD.

FIG. 4 is an illustrative diagram for describing an example of the comparison result of the signal-to-interference and noise power ratios (SINR) of an uplink and SINRs of a downlink of a WSD. Referring to FIG. 4, an uplink characteristic of the case illustrated in FIG. 2 and a downlink characteristic of the case illustrated in FIG. 3 are shown. To be more specific, cumulative distribution functions (CDFs) of SINRs of each of the uplink and downlink are shown. In this example, the values defined in Annex 1 of ECC Report 186 are used for operation parameters of the primary system and secondary system. As a result, the SINRs of the uplink are lower than the SINRs of the downlink as illustrated in FIG. 4.

As described above, on the premise that the transmitter of the primary system is separated from the devices of the secondary system to some extent, the influence of the primary system on the secondary system strongly appears for the master WSD 20 that is at a higher position, regardless of the planar positional relation between the master WSD 20 and the slave WSD 30. In other words, the influence of the primary system on the secondary system strongly appears for an uplink.

Such influence of the primary system on the secondary system can be particularly remarkable when TDD is employed as the duplex scheme. A specific example of this subject will be described with reference to FIG. 5 below.

Figure 5:
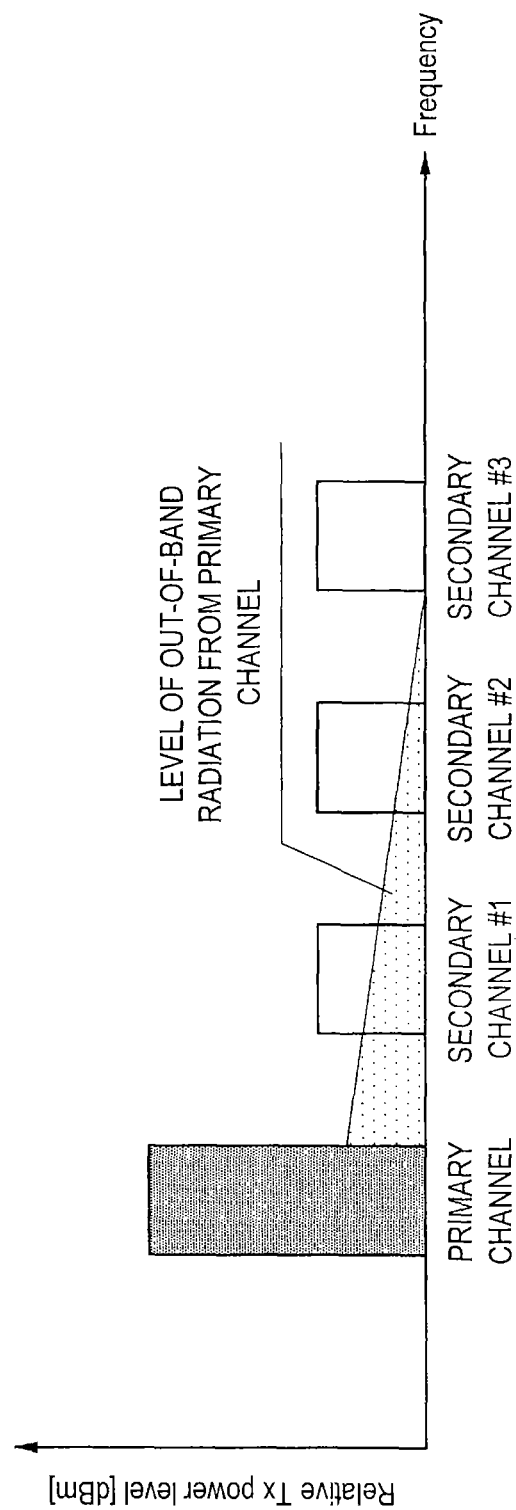
FIG. 5 is an illustrative diagram for describing an example of interference from a frequency channel of a primary system in each frequency channel used in a secondary system.

FIG. 5 is an illustrative diagram for describing an example of interference from a frequency channel of a primary system in each frequency channel used in a secondary system. Referring to FIG. 5, a primary channel that is a frequency channel used in wireless communication of a primary system and three secondary channels that are frequency channels used in wireless communication of a secondary system are shown. More serious interference occurs in the secondary channel (for example, Secondary channel #1) that is closer to the primary channel due to out-of-band radiation from the primary channel as illustrated in FIG. 5. In other words, in the secondary channel (for example, Secondary channel #1) that is closer to the primary channel, the SINR of an uplink is particularly lower than the SINR of a downlink. As a result, the throughput of the secondary system can decrease.

Thus, even when there are the transmitter and the receiver that use the same or a close frequency band, desirable wireless communication can be performed through the receiver in the present embodiment. To be more specific, for example, more desirable wireless communication can be performed through a WSD.

1.3. New Technique According to an Embodiment

Definition of New TDD Configurations

As already described with reference to FIG. 1, for example, 7 TDD configurations are defined by the 3GPP. Particularly in the present embodiment, new TDD configurations are defined. Specifically, a new TDD configuration dedicated to a downlink and/or a new TDD configuration dedicated to an uplink are defined. Examples of the new TDD configurations will be described below with reference to FIGS. 6 and 7.

Figure 6:
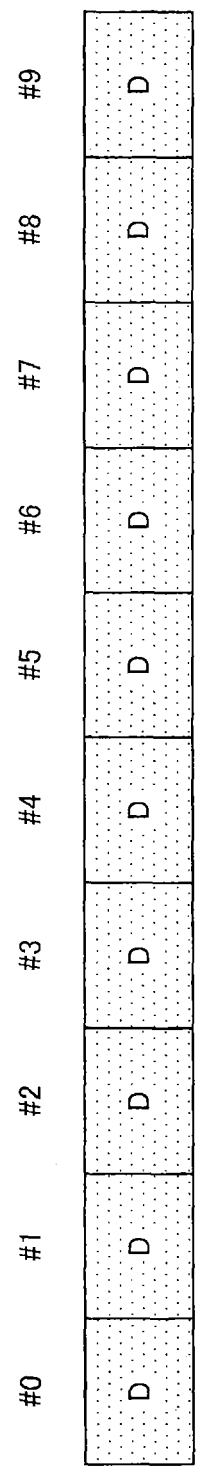
FIG. 6 is an illustrative diagram for describing a TDD configuration dedicated to a downlink.

FIG. 6 is an illustrative diagram for describing a TDD configuration dedicated to a downlink. Referring to FIG. 6, the TDD configuration dedicated to a downlink is shown as Configuration 7. As illustrated in FIG. 6, all sub-frames in the TDD configuration dedicated to a downlink are sub-frames for a downlink (i.e., downlink sub-frames).

FIG. 7 is an illustrative diagram for describing TDD configurations dedicated to uplinks. Referring to FIG. 7, the configurations dedicated to uplinks of Case 1 and Case 2 are shown as Configuration 8. Case 1 is a case in which the final sub-frame of the previous radio frame is an uplink sub-frame, and Case 2 is a case in which the final sub-frame of the previous radio frame is a downlink sub-frame. In both Case 1 and Case 2, the remaining sub-frames other than the first sub-frames (i.e., sub-frames #1 to #9) are uplink sub-frames. In addition, in Case 1, the first sub-frame (i.e., sub-frame #0) is also an uplink sub-frame. On the other hand, in Case 2, uplink transmission is not performed in a part or all of the first sub-frame. This is because reception of a downlink signal can be performed in the first sub-frame due to a propagation delay as in a special sub-frame.

For example, sub-frames dedicated to downlinks and sub-frames dedicated to uplinks are prepared as described above.

By preparing such new TDD configurations as described above, more desirable wireless communication can be performed through, for example, a receiver of a WSD.

For example, by preparing the TDD configurations dedicated to downlinks, influence of a primary channel on a secondary channel can be further reduced even when the primary channel that is used in wireless communication of a primary system and the secondary channel that is used in wireless communication of a secondary system are close to each other in the frequency direction. To be more specific, when the secondary channel is close to the primary channel in the frequency direction, the SINR of an uplink can be particularly lowered as described with reference to FIG. 5. For this reason, if a TDD configuration dedicated to a downlink is prepared, the TDD configuration dedicated to a downlink can be set as a TDD configuration for wireless communication of the secondary channel. As a result, interference from the primary system can be further suppressed even when the secondary channel is adjacent to the primary channel. That is to say, even for an available channel adjacent to the primary channel, a decrease in an SINR can be further suppressed. That is to say, desirable wireless communication can be performed through a receiver of a WSD (slave WSD).

In addition, for example, by preparing the TDD configuration dedicated to an uplink, the throughput of the uplink can be improved even when the bandwidth of a secondary channel that is away from the primary channel in the frequency direction is narrow (or when the number of secondary channels is small). To be more specific, when the secondary channel is close to the primary channel in the frequency direction, the SINR of the uplink can be particularly lowered as described with reference to FIG. 5. In other words, if the secondary channel is away from the primary channel in the frequency direction, the SINR of the uplink is not lowered very much either. For this reason, if the TDD configuration dedicated to an uplink is prepared, the TDD configuration dedicated to the uplink can be set as a TDD configuration for wireless communication of the secondary channel that is away from the primary channel. As a result, even when the bandwidth of the secondary channel is narrow (or when the number of secondary channels is small), many radio resources to be used for the uplink can be secured. For this reason, the throughput of the uplink can be improved. That is to say, more desirable wireless communication can be performed through a receiver of a WSD (master WSD).

Furthermore, for example, both the TDD configuration dedicated to a downlink and the TDD configuration dedicated to an uplink can be prepared. In this case, even in a wireless communication system which employs TDD as a duplex scheme, the same wireless communication as when FDD is employed as a duplex scheme can be performed temporarily and/or on some frequency channels. For this reason, for example, the TDD configuration dedicated to a downlink can be set for wireless communication of the secondary channel that is closer to the primary channel, and the TDD configuration dedicated to an uplink can be set for wireless communication of the secondary channel that is away from the primary channel. As a result, the throughput of the uplink can be improved while interference from the primary channel is suppressed.

Figure 8:
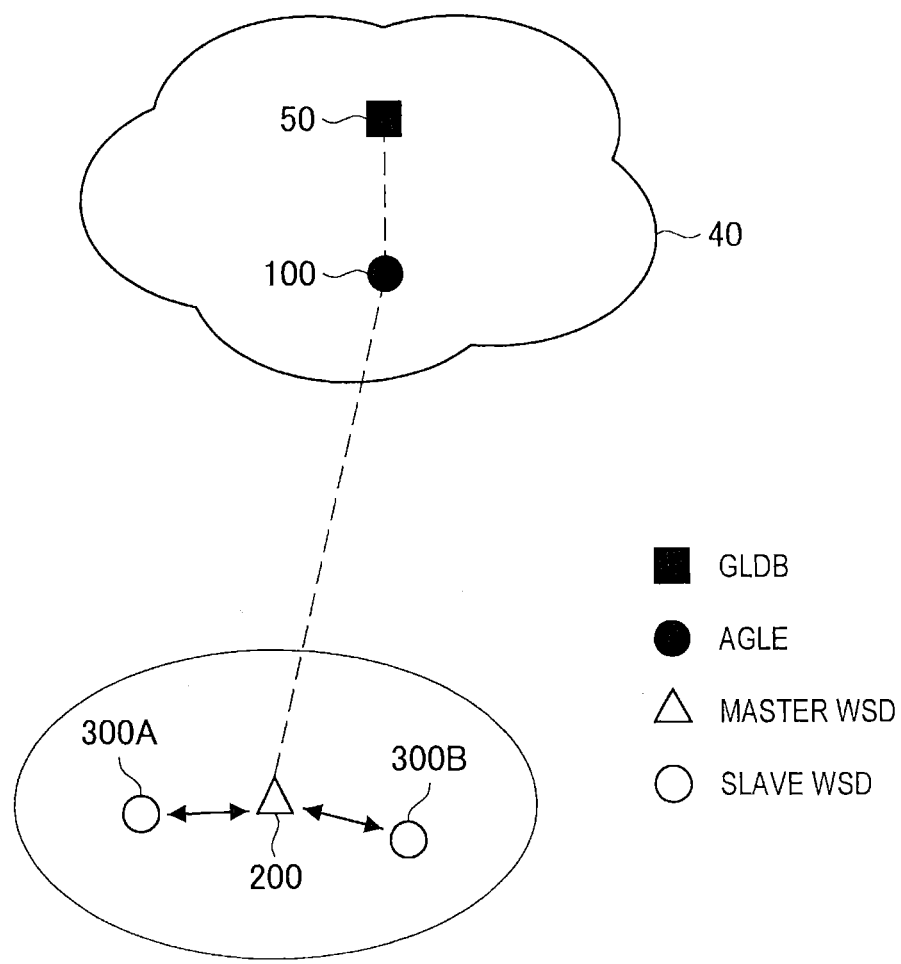
FIG. 8 is an illustrative diagram illustrating an example of a schematic configuration of a communication system according to an embodiment of the present disclosure.

2. Schematic Configuration of a Communication System According to an Embodiment Next, a schematic configuration of a communication system according to an embodiment of the present disclosure will be described with reference to FIG. 8. FIG. 8 is an illustrative diagram illustrating an example of the schematic configuration of the communication system 1 according to the present embodiment. Referring to FIG. 1, the communication system 1 includes a geo-location database (GLDB) 50, an advanced geo-location engine (AGLE) 100, a master white space device (WSD) 200, and slave WSDs. It should be noted that this example is of a communication system relating to TV white spaces.

The GLDB 50 is a regulatory database for managing data of frequency channels that a country operates. For example, the GLDB 50 provides and monitors information and protection rules pertaining to a primary system. As an example, the GLDB 50 provides information (hereinafter referred to as "available channel related information) relating to a frequency channel that a secondary system can use (hereinafter referred to as an "available channel").

The AGLE 100 is a secondary system management node operated by a frequency managing agent of a country or a third party. For example, the AGLE 100 may modify available channel related information provided by the GLDB 50 using a more advanced protection algorithm, or add new information to the available channel related information. One AGLE 100 is presented for the GLDB 50 in this example; however, a plurality of AGLEs 100 can be presented for the GLDB 50.

The master WSD 200 is a device which operates the secondary system within the area of the country. Frequency channels that the master WSD 200 uses in wireless communication, transmission power in the wireless communication, and the like can be decided by the GLDB 50 and/or the AGLE 100.

The slave WSDs 300 perform wireless communication with the master WSD 200.

It should be noted that the AGLE 100 and the master WSD 200 are communication control devices which control wireless communication according to the time division duplex (TDD) scheme. In addition, the wireless communication is, for example, wireless communication of the secondary system that secondarily uses a frequency channel for the primary system. For example, the AGLE 100 controls wireless communication of the secondary system including each master WSD 200. In addition, the master WSD 200 itself controls the wireless communication of the secondary system.

3. Configuration of Each Device

Next, examples of configurations of the AGLE 100, the master WSD 200, and the slave WSDs 300 according to the present embodiment will be described with reference to FIGS. 9 to 13.

3.1. Configuration of an AGLE

Figure 9:
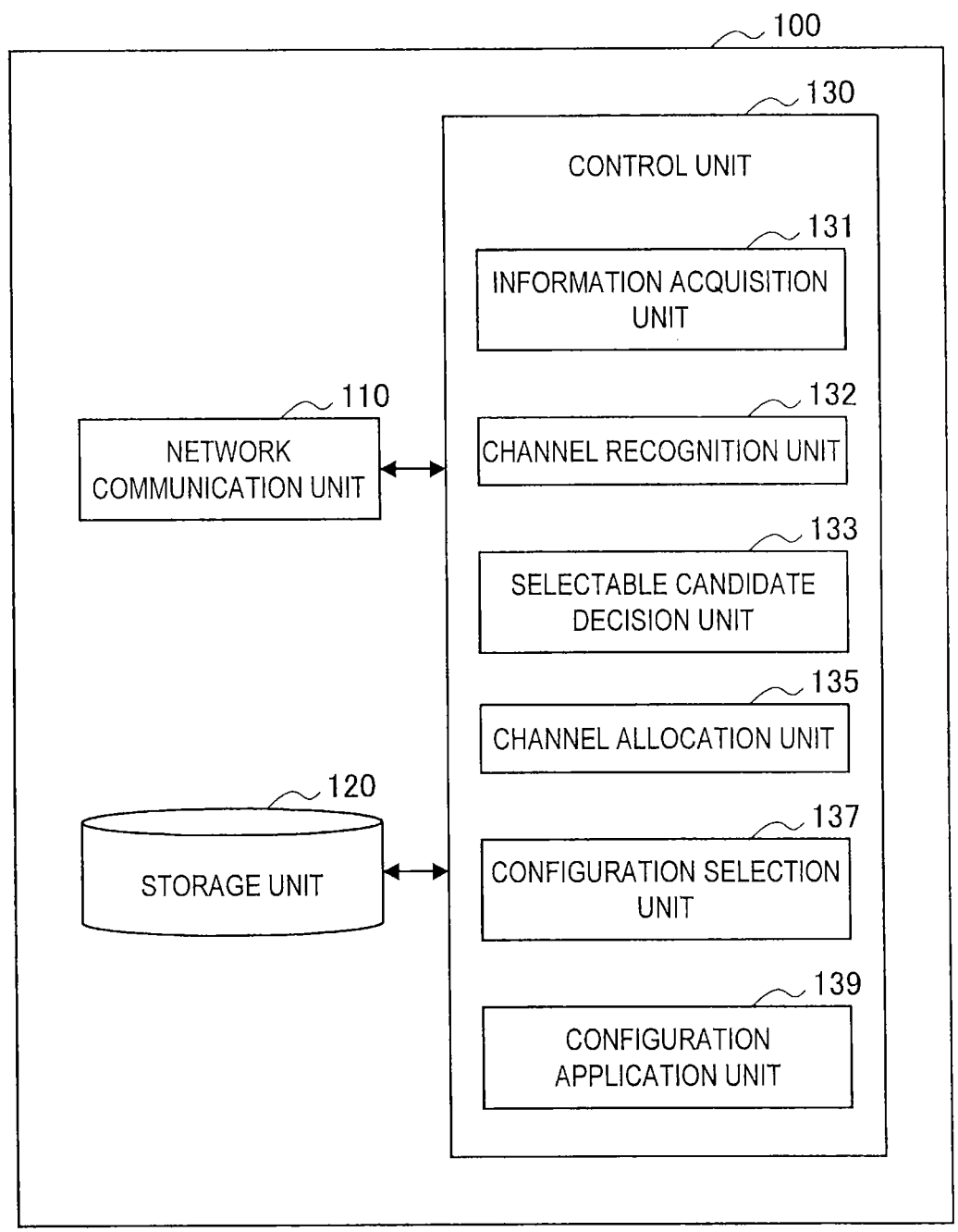
FIG. 9 is a block diagram illustrating an example of a configuration of an AGLE according to an embodiment.

An example of the configuration of the AGLE 100 according to the present embodiment will be described with reference to FIGS. 9 to 11. FIG. 9 is a block diagram illustrating the example of the configuration of the AGLE 100 according to the present embodiment. Referring to FIG. 9, the AGLE 100 has a network communication unit 110, a storage unit 120, and a control unit 130.

(Network Communication Unit 110)

The network communication unit 110 communicates with other communication nodes. For example, the network communication unit 110 communicates with the GLDB 50 and the master WSD 200.

(Storage Unit 120)

The storage unit 120 stores programs and data for operations of the AGLE 100.

In addition, the storage unit 120 stores, for example, information relating to an available channel for a secondary system (hereinafter referred to as "available channel related information). The available channel related information includes, for example, restrictions on available time, the center frequency, bandwidth, maximum transmission power, transmission spectrum mask related information, link direction, and the like of each available channel.

In addition, the storage unit 120 stores, for example, various kinds of control information to be provided to the GLDB 50 and the master WSD 200 and various kinds of control information to be provided from the GLDB 50 and the master WSD 200 in addition to the available channel related information described above.

(Control Unit 130)

The control unit 130 provides various functions of the AGLE 100. The control unit 130 includes an information acquisition unit 131, a channel recognition unit 132, a selectable candidate decision unit 133, a channel allocation unit 135, a configuration selection unit 137, and a configuration application unit 139.

(Information Acquisition Unit 131)

The information acquisition unit 131 acquires information relating to available channels for a secondary system (i.e., available channel related information).

For example, the available channel related information includes available time, center frequency, bandwidth, maximum transmission power, transmission spectrum mask related information, and the like of each available channel. It should be noted that the available channel information may be information provided by the GLDB 50, or may be information modified by the AGLE 100 (control unit 130) from the information provided by the GLDB 50.

In addition, for example, the information acquisition unit 131 acquires various kinds of information provided from the GLDB 50 and the master WSD 200 via the network communication unit 110, and causes the storage unit 120 to store the information.

In addition, for example, the information acquisition unit 131 acquires various kinds of control information to be provided to the GLDB 50 and the master WSD 200 from the storage unit 120, and provides the various kinds of information to the GLDB 50 and the master WSD 200 via the network communication unit 110.

(Channel Recognition Unit 132)

The channel recognition unit 132 recognizes a frequency channel on which wireless communication controlled by the AGLE 100 (hereinafter referred to as "target wireless communication") is performed.

For example, the channel recognition unit 132 recognizes an available channel for a secondary system from acquired available channel information. A specific example of this subject will be described below with reference to FIG. 10.

Figure 10:
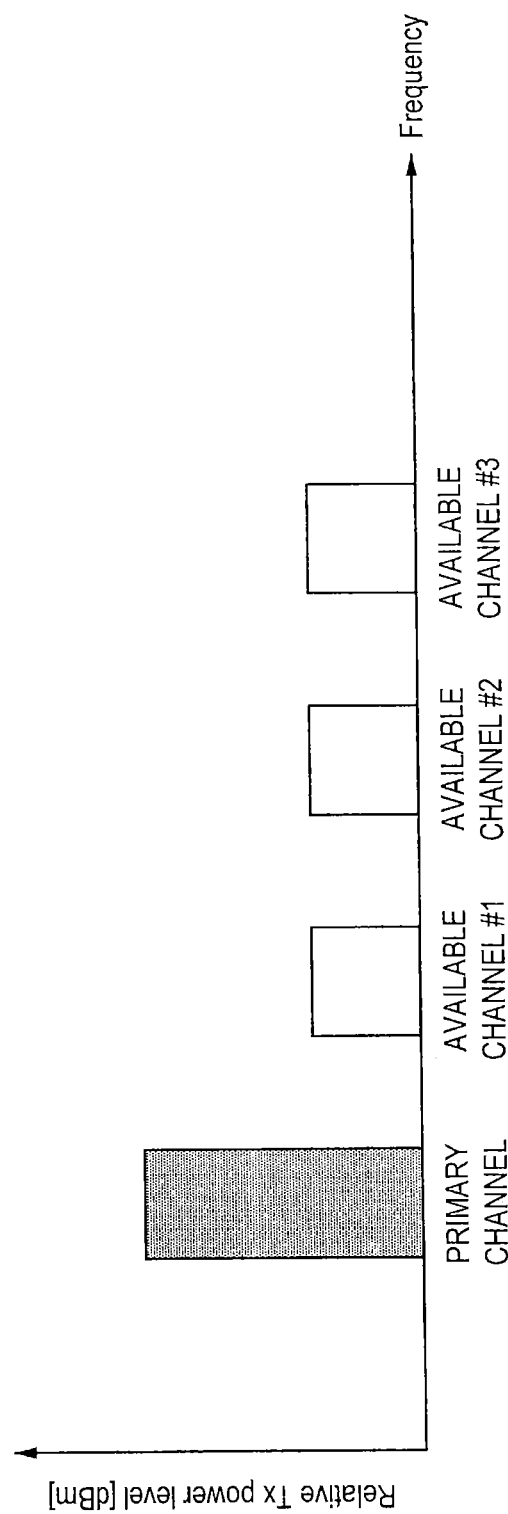
FIG. 10 is an illustrative diagram for describing an example of available channels for a secondary system.

FIG. 10 is an illustrative diagram for describing an example of available channels for a secondary system. Referring to FIG. 10, a primary channel (i.e., a frequency channel used in wireless communication of a primary system) and three available channels #1 to #3 (i.e., frequency channels that the secondary system can use) are shown. The available channel #1 is the channel that is the closest to the primary channel among the available channels, and the available channel #3 is the channel that is furthest from the primary channel among the available channels. For example, the channel recognition unit 132 recognizes the three available channels as above.

(Selectable Candidate Decision Unit 133)

For example, target wireless communication is performed on two or more frequency channels. In this case, the selectable candidate decision unit 133 decides one or more candidates that are selectable to be applied to wireless communication of the individual frequency channels (hereinafter referred to as "selectable candidates") among a plurality of candidates for a TDD configuration for each frequency channel included in the two or more frequency channels. In addition, the selectable candidate decision unit 133 decides one or more selectable candidates based on information of the distance between an interference frequency channel on which an interference signal is transmitted and each of the frequency channels in the frequency direction (hereinafter referred to as "distance related information"). For example, the interference frequency channel is a frequency channel used in a different wireless communication system from the secondary system. As an example, the interference frequency channel is a frequency channel used in the primary system corresponding to the secondary system (or another primary system) (i.e., a primary channel).

For example, wireless communication of the secondary system (i.e., target wireless communication) is performed on two or more available channels. In this case, the selectable candidate decision unit 133 decides one or more selectable candidates (TDD configurations) for each available channel included in the two or more available channels. In addition, the selectable candidate decision unit 133 decides one or more selectable candidates based on information relating to the distance between the primary channel and each of the available channels in the frequency direction (i.e., distance related information). That is to say, a restriction on the link direction (TDD configuration) is decided for each available channel based on the distance between an available channel and the primary channel.

In addition, the plurality of candidates for a TDD configuration include a TDD configuration dedicated to a downlink and/or a TDD configuration dedicated to an uplink. That is to say, the plurality of candidates for a TDD configuration include Configuration 7 and/or Configuration 8 as illustrated in FIGS. 6 and 7. In addition, the plurality of candidates include, for example, Configurations 0 to 6 as illustrated in FIG. 1.

Technique for Deciding One or More Selectable Candidates

First Example

As a first example, when the distance between the interference frequency channel and each of the frequency channels is shorter than a distance $D_1$, the one or more selectable candidates include a TDD configuration dedicated to a downlink. That is to say, when the distance between the interference frequency channel and each of the frequency channels is shorter than a first distance, the selectable candidate decision unit 133 decides a TDD configuration dedicated to a downlink as the selectable candidate.

For example, when the distance between the primary channel and each of the available channels is shorter than the distance $D_1$, the selectable candidate decision unit 133 decides the TDD configuration dedicated to a downlink as the selectable candidate. As an example, when there are the three available channels 1 to 3 illustrated in FIG. 10, the selectable candidate for the available channel 1 is the TDD configuration dedicated to a downlink.

Accordingly, for the available channel that is close to the primary channel (interference frequency channel), the TDD configuration with only downlink sub-frames (TDD configuration with no uplink sub-frame) is selected and applied. As a result, on the available channel, only wireless communication of the downlink is performed, without performing wireless communication of an uplink. For this reason, interference in the available channel is suppressed. That is to say, a decrease in the SINR of the available channel is suppressed.

Second Example

As a second example, when the distance between the interference frequency channel and each of the frequency channels is longer than a distance $D_2$, the one or more selectable candidates include a TDD configuration dedicated to an uplink.

For example, when the distance between the primary channel and each of the available channels is longer than the distance $D_2$, the selectable candidate decision unit 133 decides the TDD configuration dedicated to an uplink as one selectable candidate. As an example, when there are the three available channels 1 to 3 as illustrated in FIG. 10, one or more selectable candidates for the available channel 3 includes the TDD configuration dedicated to an uplink.

Accordingly, for the available channel that is away from the primary channel (interference frequency channel), the TDD configuration only with uplink sub-frames can be selected. For this reason, due to the selection of the TDD configuration, the throughput of the uplink in the secondary system can be improved even when the bandwidth of the available channel (or the sum of the bandwidths of all available channels) is narrow.

Third Example

As a third example, when the distance between the interference frequency channel and each of the frequency channels in the frequency direction is even longer, the one or more selectable candidates include a TDD configuration having a larger number of uplink sub-frames.

For example, when the distance between the primary channel and each of the available channels in the frequency direction is even longer, the selectable candidate decision unit 133 decides a TDD configuration having a larger number of uplink sub-frames as a selectable candidate. As an example, when there are the three available channels 1 to 3 as illustrated in FIG. 10, the selectable candidate for the available channel 3 includes Configuration 8 (i.e., the TDD configuration dedicated to the uplink). On the other hand, a selectable candidate for the available channel 1 and a selectable candidate for the available channel 2 do not include Configuration 8. In addition, for example, the selectable candidate for the available channel 2 includes Configurations 0 to 6. On the other hand, the selectable candidate for the available channel 1 only includes Configuration 7 without including Configurations 0 to 6. In this manner, as the available channel is farther from the primary channel, the selectable candidates include a TDD configuration having a larger number of uplink sub-frames.

Accordingly, when an available channel is farther from the primary channel (interference frequency channel), a TDD configuration having a larger number of uplink sub-frames can be selected for the available channel. On the other hand, when an available channel is closer to the primary channel (interference frequency channel), only a TDD configuration having a smaller number of uplink sub-frames can be selected for the available channel. For this reason, due to the selection of the TDD configuration, interference in the available channels is suppressed. That is to say, a decrease of the SINR of the available channels is suppressed.

The first to third examples of the technique for deciding one or more selectable candidates have been described as above. Information of the selectable candidates decided as above is, for example, added to the available channel related information. That is to say, restrictions on the link direction are added to the available channel related information. An example of such available channel related information will be described with reference to FIG. 11.

FIG. 11 is an illustrative diagram for describing the example of available channel related information to which information of selectable candidates is added. Referring to FIG. 11, the available channel related information is shown in the form of a list. For example, the available channel related information includes available duration, center frequency, bandwidth, maximum transmission power, transmission spectrum mask related information, and a restriction on the link direction of the available channels. The restriction on the link direction is the same as selectable candidates. For example, for an available channel with the center frequency of f1, the restriction on the link direction is only an FDD uplink. That is to say, a selectable candidate for the available channel is only the TDD configuration dedicated for the uplink. In addition, for an available channel with the center frequency of f2, all link directions are approved. That is to say, selectable candidates for the available channel are all TDD configurations. In addition, for an available channel with the center frequency of fn, the restriction on the link direction is only an FDD downlink. That is to say, a selectable candidate for the available channel is only the TDD configuration dedicated to the downlink. In this manner, the available channel related information that includes selectable candidates is generated.

Decision Based on QoS

In addition, the one or more selectable candidates may be decided based further on information relating to quality of service (QoS) desired for target wireless communication (hereinafter referred to as "QoS related information"). That is to say, the selectable candidate decision unit 133 may decide the one or more selectable candidates based on distance related information and QoS related information.

For example, the QoS related information includes throughput, latency, bandwidth, or the like. As an example, when high throughput is not demanded, the selectable candidate decision unit 133 may decide Configurations 0 to 6 as selectable candidates for an available channel that is close to the primary channel.

Accordingly, TDD configurations can be selected with a restriction that is necessary and sufficient for wireless communication according to QoS desired for the wireless communication. For this reason, frequency channels can be used more flexibly.

Distance Related Information

It should be noted that, as an example, the distance related information (i.e., information relating to the distance between the primary channel and each of the available channels in the frequency direction) is, for example, the distance between the center frequency of the primary channel and the center frequency of each of the available channels in the frequency direction. In this case, for example, the center frequency of the primary channel is included in the control information provided from the GLDB 50, and the center frequency of each of the available channels is included in the available channel related information.

As described above, selectable candidates for a TDD configuration are decided for each of the frequency channels. Thereby, the throughput can be improved while suppressing influence of interference.

(Channel Allocation Unit 135)

The channel allocation unit 135 allocates a frequency channel to target wireless communication.

For example, the channel allocation unit 135 allocates one or more available channels to wireless communication of the secondary system.

Allocation of a Frequency Channel that is Away from the Primary Channel

In addition, the target wireless communication is performed on one or more frequency channels. Then, the one or more frequency channels include a frequency channel that is a distance $D_4$ or farther from the interference frequency channel on which an interference signal is transmitted in the frequency direction.

Specifically, for example, wireless communication of the secondary system is performed on one or more available channels. Then, the one or more available channels include an available channel that is the distance $D_4$ or farther from the primary channel in the frequency direction. That is to say, the channel allocation unit 135 allocates an available channel that is the distance $D_4$ or farther from the primary channel in the frequency direction for the wireless communication of the secondary system.

With such allocation, interference from the primary channel can be reduced more. For this reason, the throughput of the uplink in the secondary system can be improved.

Allocation Destination of a Frequency Channel

It should be noted that, when there are a plurality of master WSDs 200, the channel allocation unit 135 may allocate the same available channel or allocate different available channels to each of the master WSDs 200. As an example, according to the position of each of the master WSDs 200, the channel allocation unit 135 may allocate available channels thereto, taking influence of the primary channel on the positions into account.

(Configuration Selection Unit 137)

The configuration selection unit 137 selects a TDD configuration for the target wireless communication among the plurality of candidates for a TDD configuration.

For example, the configuration selection unit 137 selects a TDD configuration for wireless communication (i.e., the target wireless communication) of the secondary system among the plurality of candidates for a TDD configuration.

For example, the plurality of candidates include at least one of the TDD configuration dedicated to the downlink and the TDD configuration dedicated to the uplink.

In addition, for example, the plurality of candidates include the TDD configuration dedicated to the downlink. Accordingly, even for an available channel adjacent to the primary channel, interference from the primary system can be further suppressed as described above. That is to say, even for an available channel adjacent to the primary channel, a decrease of the SINR can be further suppressed.

In addition, for example, the plurality of candidates include the TDD configuration dedicated to the uplink. Accordingly, even when the bandwidth of the secondary channels that are away from the primary channel is narrow (or the number of secondary channels is small), many radio resources for the uplink can be secured as described above. For this reason, the throughput of the uplink can be improved.

Then, for example, the plurality of candidates include both the TDD configuration dedicated to the downlink and the TDD configuration dedicated to the uplink as above. In this case, even in a wireless communication system which employs TDD as a duplex scheme, the same wireless communication as when FDD is employed as a duplex scheme can be performed temporarily and/or on some frequency channels. As a result, the throughput of the uplink can be improved while suppressing interference from the primary channel.

In addition, for example, a link direction configuration dedicated to an uplink includes a TDD configuration in which uplink transmission is not performed in a part or all of the first sub-frame among a plurality of sub-frames included in radio frames as described above. This subject is as described in Case 2 with reference to FIG. 7. Accordingly, even when the final sub-frame of the previous radio frame is a downlink sub-frame, interference in a downlink signal of the downlink sub-frame can be avoided.

When the Target Wireless Communication is Performed on Two or More Frequency Channels When the target wireless communication is performed on two or more frequency channels, the configuration selection unit 137 selects a TDD configuration for the wireless communication of the individual frequency channels among the plurality of candidates for each of the frequency channels included in the two or more frequency channels.

For example, when the wireless communication of the secondary system is performed on two or more available channels, the configuration selection unit 137 selects a TDD configuration for the individual available channels included in the two or more available channels.

Technique of Selecting a TDD Configuration

Selection from Selectable Candidates

For example, the configuration selection unit 137 selects a TDD configuration for the wireless communication of the individual frequency channels from one or more selectable candidates among the plurality of candidates.

For example, the configuration selection unit 137 selects a TDD configuration from one or more selectable candidates decided by the selectable candidate decision unit 133 for each of available channels included in the two or more available channels.

Selection According to the Distance from the Primary Channel

First Example

As a first example, the two or more frequency channels on which the target wireless communication is performed include a first frequency channel that is closer to the interference frequency channel on which an interference signal is transmitted and a second frequency channel that is away from the interference frequency channel. Then, the configuration selection unit 137 selects a first TDD configuration in which the number of downlink sub-frames is a first number as a TDD configuration for wireless communication of the first frequency channel. In addition, the configuration selection unit 137 selects a second link direction configuration in which the number of downlink sub-frames is a second number that is smaller than the first number as a TDD configuration for wireless communication of the second frequency channel.

Specifically, for example, the two or more available channels on which the wireless communication of the secondary system is performed include a first available channel that is close to the primary channel and a second available channel that is away from the primary channel. Then, the configuration selection unit 137 selects a first TDD configuration in which the number of downlink sub-frames is $N_1$ as a TDD configuration for wireless communication of the first available channel. In addition, the configuration selection unit 137 selects a second TDD configuration in which the number of downlink sub-frames is $N_2$ ($N_2<N_1$) as a TDD configuration for wireless communication of the second available channel. That is to say, for the available channel that is closer to the primary channel, the TDD configuration having a larger number of downlink sub-frames is selected, and for the available channel that is away from the primary channel, the TDD configuration having a smaller number of downlink sub-frames is selected.

With the selection of the TDD configuration described above, interference in the available channels is suppressed. That is to say, a decrease in the SINR of the available channels is suppressed.

It should be noted that, when the selectable candidates are decided as in the "third example" of the "technique for deciding one or more selectable candidates" described above, the selection of the TDD configuration can be automatically realized by selecting the TDD configuration from the selectable candidates.

Second Example

As a second example, when the distance between the interference frequency channel and each of the frequency channels in the frequency direction is shorter than a distance $D_3$, the configuration selection unit 137 selects a TDD configuration dedicated to a downlink as a TDD configuration for wireless communication of each of the frequency channels.

Specifically, when the distance between the primary channel and each of the available channels is shorter than $D_3$, for example, the configuration selection unit 137 selects a TDD configuration dedicated to a downlink as a TDD configuration for the wireless communication of each of the available channels.

With the selection of the TDD configuration as above, interference in the available channel that is close to the primary channel is suppressed. That is to say, a decrease in the SINR of the available channel is suppressed.

It should be noted that, when the selectable candidate is decided as in the "first example" of the "technique for deciding one or more selectable candidates" described above, the selection of the TDD configuration can be automatically realized by selecting the TDD configuration from the selectable candidates.

When the Target Wireless Communication is Performed on One Frequency Channel

When the target wireless communication is performed on one frequency channel, for example, the configuration selection unit 137 selects a TDD configuration for the wireless communication of the one frequency channel among the plurality of candidates.

For example, when the wireless communication of the secondary system is performed on one available channel, the configuration selection unit 137 selects a TDD configuration for the wireless communication of the one available channel.

As an example, when the wireless communication of the secondary system needs both an uplink and a downlink, the configuration selection unit 137 selects any one of Configurations 0 to 6 as the TDD configuration for the wireless communication of the one available channel.

When a Predetermined Type of Wireless Communication is Performed

As described above, the target wireless communication is performed, for example, on one or more frequency channels, and the one or more frequency channels include a frequency channel that is the distance $D_4$ or farther from the interference frequency channel on which an interference signal is transmitted in the frequency direction. In addition, when the target wireless communication is a predetermined type of wireless communication, the configuration selection unit 137 selects a TDD configuration in which the number of uplink sub-frames is greater than a predetermined number as a TDD configuration for the frequency channel that is the distance $D_4$ or farther from the interference channel. For example, the predetermined type of wireless communication is machine-to-machine (M2M) communication.

For example, the wireless communication of the secondary system is performed on one or more available channels, and the one or more available channels include a frequency channel that is the distance $D_4$ or farther from the primary channel in the frequency direction. In addition, when the line communication of the secondary system is M2M communication, the configuration selection unit 137 selects a TDD configuration in which the number of uplink sub-frames is greater than a predetermined number as a TDD configuration for the frequency channel that is the distance D4 or farther from the interference channel.

With the selection of the TDD configuration as above, interference from the primary channel can be reduced more and the throughput of the uplink can be improved in the wireless communication in which traffic of the uplink is heavy (for example, M2M communication).

(Configuration Application Unit 139)

The configuration application unit 139 applies a selected TDD configuration to the target wireless communication.

Specifically, the configuration application unit 139 applies a selected TDD configuration to, for example, wireless communication of the secondary system.

When the Target Wireless Communication is Performed on Two or More Frequency Channels For example, the target wireless communication is performed on two or more frequency channels. In this case, the configuration application unit 139 applies a TDD configuration selected for each of frequency channels included in the two or more frequency channels to the wireless communication of each of the frequency channels.

Specifically, for example, wireless communication of the secondary system is performed on two or more available channels. In this case, the configuration application unit 139 applies a TDD configuration selected for each of available channels included in the two or more available channels to the wireless communication of each of the available channels.

Specific Application Technique

For example, the configuration application unit 139 applies a selected TDD configuration to the target wireless communication (for example, wireless communication of the secondary system) by setting the selected TDD configuration in the master WSD 200.

Specifically, for example, the configuration application unit 139 notifies the master WSD 200 of available channel related information, an available channel allocation result, and a TDD configuration selection result via the network communication unit 110. Then, the master WSD 200 that has received the notification sets the selected TDD configuration for wireless communication of the allocated available channel. Then, the wireless communication in compliance with the selected TDD configuration is performed.

3.2. Configuration of a Master WSD

Figure 12:
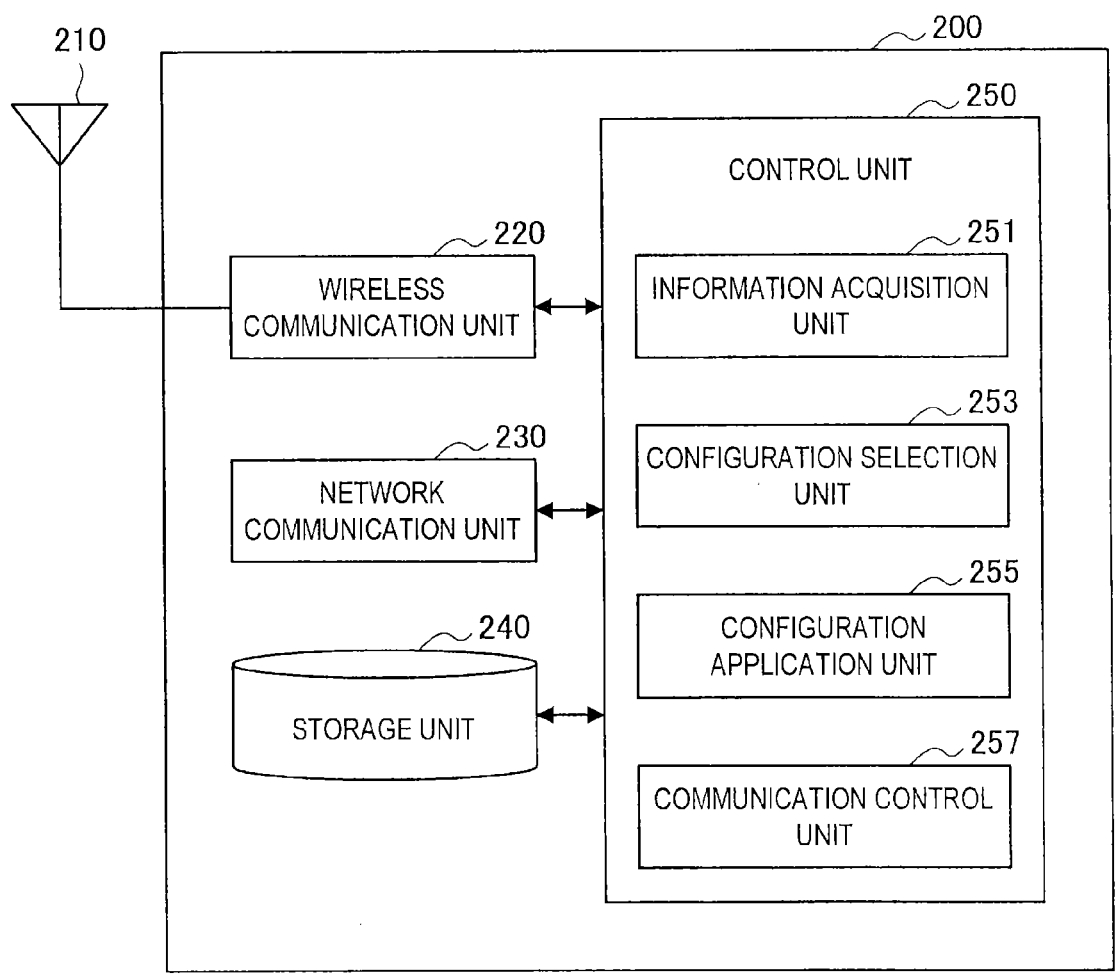
FIG. 12 is a block diagram illustrating an example of a configuration of a master WBS according to an embodiment.

Next, an example of a configuration of the master WSD 200 according to the present embodiment will be described with reference to FIG. 12. FIG. 12 is a block diagram illustrating the example of the configuration of the master WSD 200 according to the present embodiment. Referring to FIG. 12, the master WSD 200 has an antenna unit 210, a wireless communication unit 220, a network communication unit 230, a storage unit 240, and a control unit 250.

(Antenna Unit 210)

The antenna unit 210 receives a radio signal, and outputs the received radio signal to the wireless communication unit 220. In addition, the antenna unit 210 transmits a transmission signal output from the wireless communication unit 220.

(Wireless Communication Unit 220)

The wireless communication unit 220 performs wireless communication with the slave WSDs 300 when the slave WSDs 300 are positioned within the communication range of the master WSD 200.

(Network Communication Unit 230)

The network communication unit 230 communicates with other communication nodes. For example, the network communication unit 230 communicates with the AGLE 100.

(Storage Unit 240)

The storage unit 240 stores programs and data for operations of the master WSD 200.

In addition, for example, the storage unit 240 stores the available channel related information, available channel allocation result, and TDD configuration selection result.

In addition, for example, the storage unit 240 stores various kinds of control information provided from the AGLE 100 in addition to the above information. In addition, the storage unit 240 stores various kinds of control information to be provided to the AGLE 100.

(Control Unit 250)

The control unit 250 provides various functions to the master WSD 200. The control unit 250 includes an information acquisition unit 251, a configuration selection unit 253, a configuration application unit 255, and a communication control unit 257.

(Information Acquisition Unit 251)

The information acquisition unit 251 acquires information necessary for the target wireless communication.

For example, the information acquisition unit 251 acquires the available channel related information, available channel allocation result, and TDD configuration selection result from the AGLE 100 via the network communication unit 230. In addition, the information acquisition unit 251 causes the storage unit 240 to store the information.

In addition, for example, the information acquisition unit 251 acquires various other kinds of information provided from the AGLE 100 via the network communication unit 230, and causes the storage unit 240 to store the information.

In addition, for example, the information acquisition unit 251 acquires various kinds of control information to be provided to the AGLE 100 from the storage unit 240, and provides the various kinds of information to the AGLE 100 via the network communication unit 230.

(Configuration Selection Unit 253)

The configuration selection unit 253 selects a TDD configuration for the target wireless communication among a plurality of candidates for a TDD configuration.

For example, the configuration selection unit 253 selects a TDD configuration for the wireless communication of the secondary system (i.e., target wireless communication) among the plurality of candidates for the TDD configuration.

In addition, for example, when the target wireless communication is performed on two or more frequency channels, the configuration selection unit 253 selects a TDD configuration for the wireless communication of each of the frequency channels among the plurality of candidates for each of the frequency channels included in the two or more frequency channels.

For example, when the wireless communication of the secondary system is performed on two or more available channels, the configuration selection unit 253 selects a TDD configuration for each of the available channels included in the two or more available channels.

Specific Selection Technique

For example, the configuration selection unit 253 selects a TDD configuration based on the result of selection of the TDD configuration provided from the AGLE 100.

(Configuration Application Unit 255)

The configuration application unit 255 applies the selected TDD configuration to the target wireless communication.

Specifically, for example, the configuration application unit 255 applies the selected TDD configuration to the wireless communication of the secondary system.

When the Target Wireless Communication is Performed on Two or More Frequency Channels For example, the target wireless communication is performed on two or more frequency channels. In this case, the configuration application unit 255 applies a TDD configuration selected for each of the frequency channels included in the two or more frequency channels to the wireless communication of each of the frequency channels.

Specifically, for example, the wireless communication of the secondary system is performed on two or more available channels. In this case, the configuration application unit 255 applies the TDD configuration selected for each of the available channels included in the two or more available channels to the wireless communication of each of the available channels.

Specific Application Technique

For example, the configuration application unit 255 applies the selected TDD configuration to the target wireless communication (for example, the wireless communication of the secondary system) by setting the selected TDD configuration in the master WSD 200. In addition, the configuration application unit 255 notifies the slave WSDs 300 of the set TDD configuration via the wireless communication unit 220.

(Communication Control Unit 257)

The communication control unit 257 controls wireless communication in compliance with the time division duplex (TDD) scheme. For example, the wireless communication is wireless communication of the secondary system which secondarily uses a frequency channel for the primary system.

Specifically, for example, the communication control unit 257 controls the wireless communication of the secondary system based on the TDD scheme according to the set TDD configuration. That is to say, the communication control unit 257 causes the wireless communication unit 220 to transmit a downlink signal using downlink sub-frames and to receive an uplink signal using uplink sub-frames.

3.3. Configuration of a Slave WSD

Figure 13:
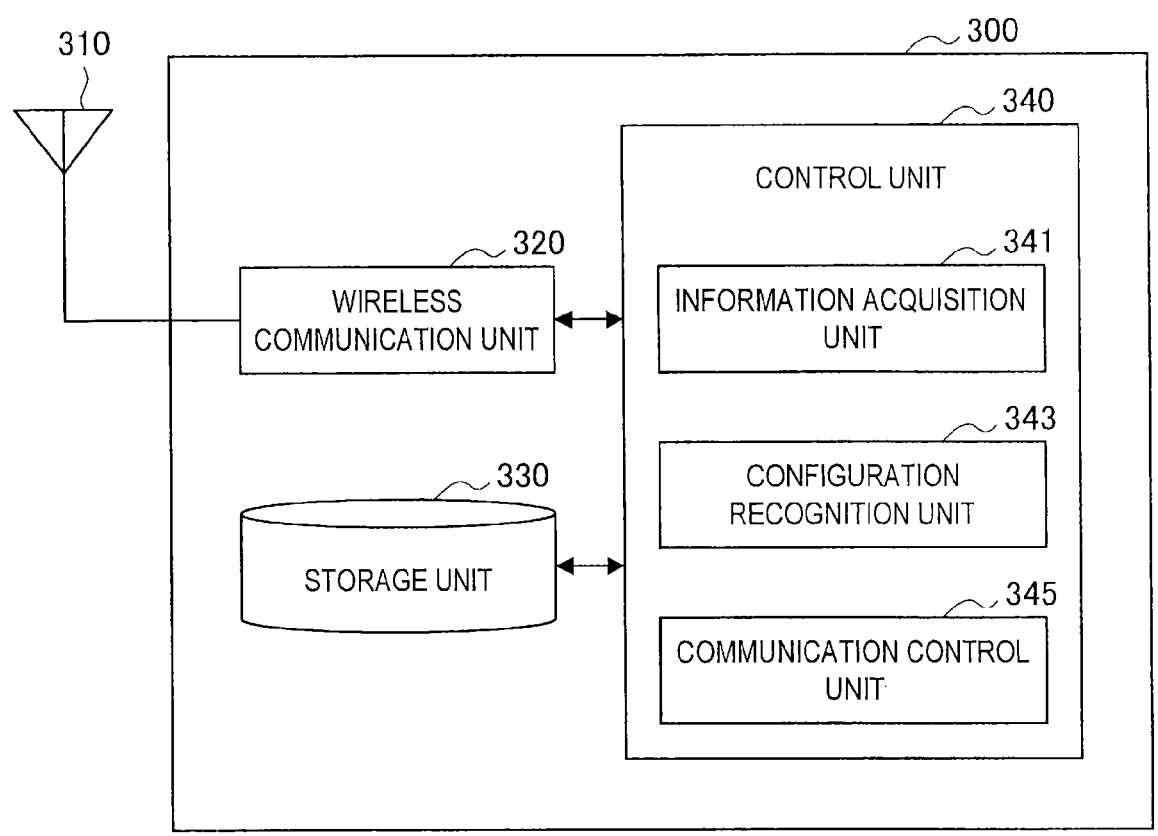
FIG. 13 is a block diagram illustrating an example of a configuration of a slave WSD according to an embodiment.

Next, an example of a configuration of the slave WSD 300 according to the present embodiment will be described with reference to FIG. 13. FIG. 13 is a block diagram illustrating the example of the configuration of the slave WSD 300 according to the present embodiment. Referring to FIG. 13, the slave WSD 300 has an antenna unit 310, a wireless communication unit 320, a storage unit 330, and a control unit 340.

(Antenna Unit 310)

The antenna unit 310 receives a radio signal, and outputs the received radio signal to the wireless communication unit 320. In addition, the antenna unit 310 transmits a transmission signal output by the wireless communication unit 320.

(Wireless Communication Unit 320)

The wireless communication unit 320 performs wireless communication with the master WSD 200 when the slave WSD 300 is positioned within the communication range of the master WSD 200.

(Storage Unit 330)

The storage unit 330 stores programs and data for operations of the slave WSD 300.

In addition, for example, the storage unit 330 stores a TDD configuration set by the master WSD 200.

In addition, for example, the storage unit 330 stores information provided from the master WSD 200 in addition to the above-mentioned information. In addition, the storage unit 330 stores various kinds of control information to be provided to the master WSD 200.

(Control Unit 340)

The control unit 340 provides various functions of the slave WSD 300. The control unit 340 includes an information acquisition unit 341, a configuration recognition unit 343, and a communication control unit 345.

(Information Acquisition Unit 341)

The information acquisition unit 341 acquires information necessary for the target wireless communication.

For example, the information acquisition unit 341 acquires the set TDD configuration from the master WSD 200 via the wireless communication unit 320. Then, the information acquisition unit 34 causes the storage unit 330 to store the set TDD configuration.

In addition, for example, the information acquisition unit 341 acquires various other kinds of information provided from the master WSD 200 via the wireless communication unit 320, and causes the storage unit 330 to store the information.

In addition, for example, the information acquisition unit 341 acquires various kinds of control information to be provided to the master WSD 200 from the storage unit 330, and provides the various kinds of information to the master WSD 200 via the wireless communication unit 320.

(Configuration Recognition Unit 343)

The configuration recognition unit 343 recognizes a TDD configuration to be applied to the target wireless communication among a plurality of candidates for the TDD configuration.

For example, the information acquisition unit 341 acquires the set TDD configuration from the master WSD 200 as described above. Then, the configuration recognition unit 343 recognizes the set TDD configuration.

(Communication Control Unit 345)

The communication control unit 345 controls wireless communication in compliance with the time division duplex (TDD) scheme. For example, the wireless communication is wireless communication of the secondary system which secondarily uses a frequency channel for the primary system.

Specifically, for example, the communication control unit 345 controls the wireless communication of the secondary system based on the TDD scheme according to the set TDD configuration. That is to say, the communication control unit 345 causes the wireless communication unit 320 to transmit a downlink signal using downlink sub-frames and to receive an uplink signal using uplink sub-frames.

4. Flow of a Process

Figure 14:
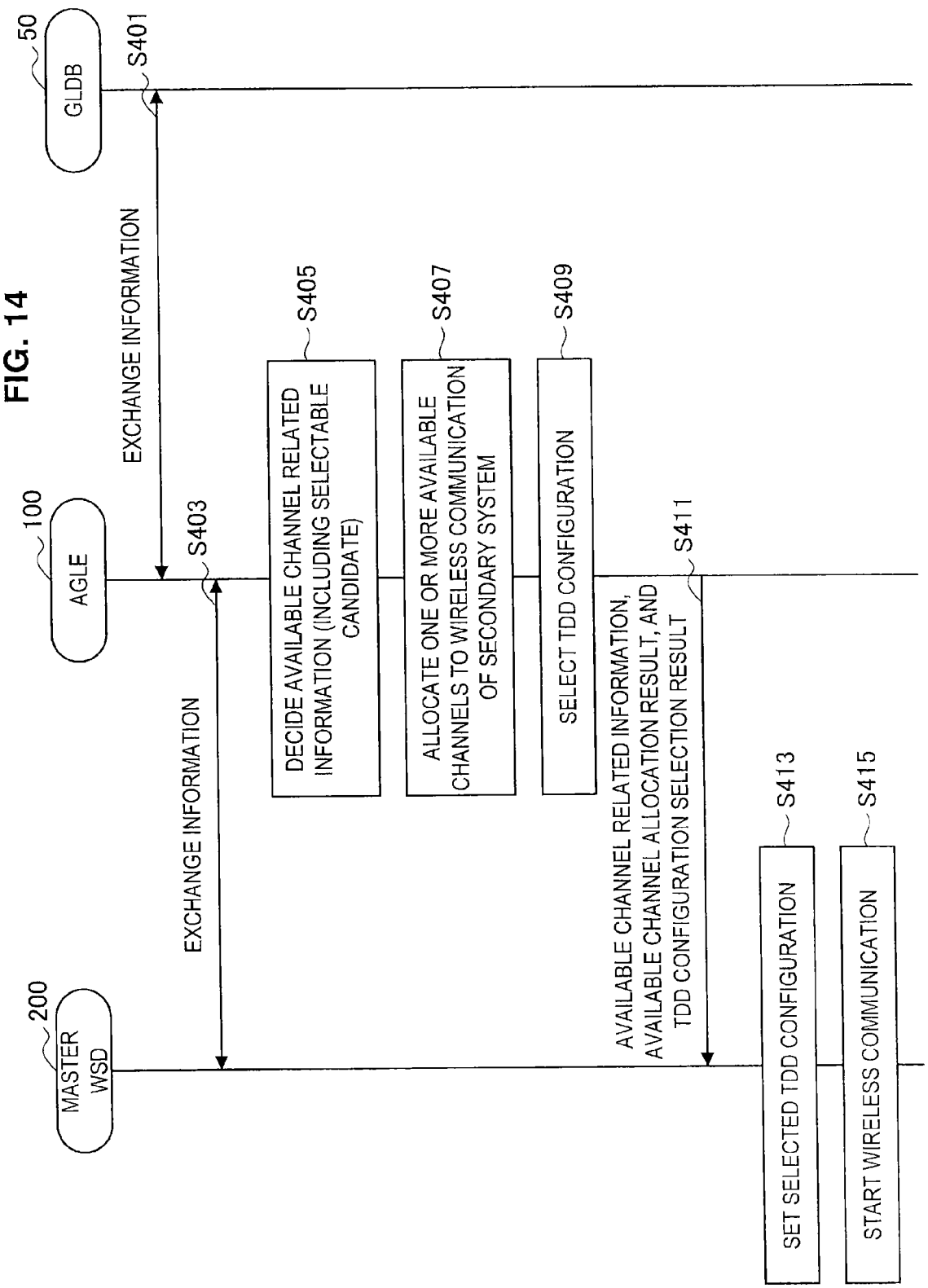
FIG. 14 is a sequence diagram illustrating an example of the schematic flow of a communication control process according to an embodiment.

Next, an example of a communication control process according to the present embodiment will be described with reference to FIG. 14. FIG. 14 is a sequence diagram illustrating the example of the schematic flow of the communication control process according to the present embodiment.

First, the GLDB 50 and the AGLE 100 exchange information in a cyclic manner or according to a predetermined trigger (Step S401). The exchanged information herein includes for example, synchronization information (NTP information, Global Positioning System (GPS), IEEE 1588 (a protocol for causing clocks of base stations distributed on a network to synchronize with each other), time correction information, and the like), ID information, managed area information (country, region, latitude, longitude, altitude, and the like), security information (security keys for mutual authentication and the like), information updating cycle information, backup related information, and primary system transmitter information (height of an antenna, position (latitude and longitude), transmission spectrum mask information, use frequency related information (center frequency and bandwidth), gain of an antenna, directivity of an antenna, and the like).

In addition, the AGLE 100 and the master WSD 200 exchange information in a cyclic manner or according to a predetermined trigger (Step S403). The exchanged information herein includes, for example, synchronization information, ID information, managed area information, security information, information updating cycle information, backup related information, and transmitter and receiver information of the master WSD 200 and the slave WSD 300 (height of an antenna, position (latitude and longitude), transmission spectrum mask information, use frequency related information (center frequency and bandwidth), gain of an antenna, directivity of an antenna, and the like).

In addition, the AGLE 100 decides information relating to an available channel for the secondary system (i.e., available channel related information) (Step S405). The available channel related information includes available time, center frequency, bandwidth, maximum transmission power, and transmission spectrum mask related information of each available channel. In addition, the AGLE 100 (selectable candidate decision unit 133) decides one or more selectable candidates (TDD configurations) among a plurality of candidates for a TDD configuration for each of available channels. The one or more selectable candidates are decided based on information relating to the distance between the primary channel and each of the available channels in the frequency direction (i.e., distance related information). Then, the information of the one or more selectable candidates decided as described above is added to the available channel related information.

Then, the AGLE 100 (channel allocation unit 135) allocates the one or more available channels to wireless communication of the secondary system (Step S407).

In addition, the AGLE 100 (configuration selection unit 137) selects a TDD configuration for wireless communication of the individual available channels among the plurality of candidates for the TDD configuration for each of the allocated available channels (Step S409). Specifically, the AGLE 100 selects a TDD configuration for wireless communication of the individual available channels from one or more selectable candidates (TDD configurations) for each of the allocated available channels.

Then, AGLE 100 (configuration application unit 139) notifies the master WSD 200 of the TDD configuration selection result (Step S411). In addition, the AGLE 100 also notifies the master WSD 200 of the available channel related information and the available channel allocation result.

After that, the master WDS 200 (configuration application unit 255) sets the TDD configuration selected for each of the available channels in the master WSD 200 (S413).

Then, the master WSD 200 (communication control unit 257) starts wireless communication of the secondary system based on the TDD scheme in compliance with the set TDD configuration.

5. Modified Examples

Next, first to fourth modified examples of the present embodiment will be described.

5.1. First Modified Example

In the examples of the present embodiment described above, the AGLE 100 performs decision of selectable candidates, allocation of available channels, and selection of a TDD configuration. On the other hand, in the first modified example, the GLDB 50 performs decision of selectable candidates, allocation of available channels, and selection of a TDD configuration. That is to say, in the first modified example, the functions of the selectable candidate decision unit 133, the channel allocation unit 135, and the configuration selection unit 137 of the AGLE 100 are provided in the GLDB 50 instead of the AGLE 100. An example of the communication control process according to the first modified example will be described below with reference to FIG. 15.

Figure 15:
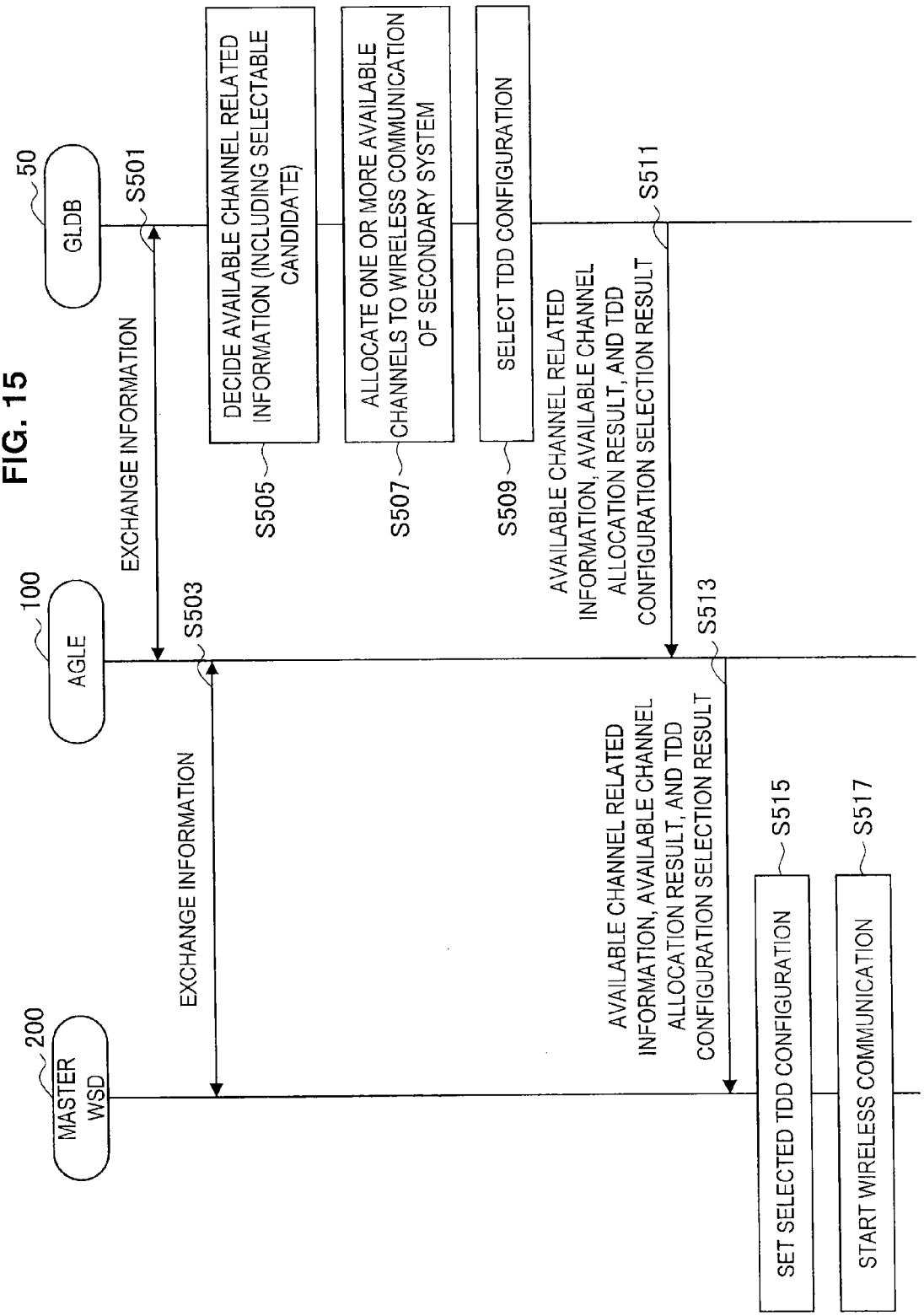
FIG. 15 is a sequence diagram illustrating an example of the schematic flow of a communication control process according to a first modified example of an embodiment.

FIG. 15 is a sequence diagram illustrating an example of the schematic flow of a communication control process according to the first modified example of the embodiment. It should be noted that Steps S501, S503, S513, S515, and S517 are the same as Steps S401, S403, S411, S413, and S415 of the communication control process described with reference to FIG. 14. Thus, only Steps S505, S507, S509, and S511 will be described here.

The GLDB 50 decides information relating to available channels for the secondary system (i.e., available channel related information) (Step S505). The available channel related information includes available time, center frequency, bandwidth, maximum transmission power, and transmission spectrum mask related information of each of the available channels. In addition, the GLDB 50 decides one or more selectable candidates (TDD configurations) among a plurality of candidates for a TDD configuration for each of the available channels. The one or more selectable candidates are decided based on information relating to the distance between the primary channel and each of the available channels in the frequency direction (i.e., distance related information). Then, the information of the one or more selectable candidates decided in this manner is added to the available channel related information.

Then, the GLDB 50 allocates the one or more available channels to wireless communication of the secondary system (Step S507).

In addition, the GLDB 50 selects a TDD configuration for the wireless communication of the individual available channels among the plurality of candidates for the TDD configuration for each of the allocated available channels (Step S509).

Then, the GLDB 50 notifies the AGLE 100 of the TDD configuration selection result (Step S511). In addition, the GLDB 50 also notifies the AGLE 100 of the available channel related information and the available channel allocation result.

As described above, according to the first modified example, the decision of selectable candidates, allocation of available channels, and selection of a TDD configuration are performed by the GLDB 50. It should be noted that some of the decision of selectable candidates, allocation of available channels, and selection of a TDD configuration may be performed by the GLDB 50 and the rest may be performed by the AGLE 100.

5.2. Second Modified Example

In the example of the embodiment described above, the AGLE 100 performs selection of a TDD configuration. On the other hand, in the second modified example of the embodiment, the macro WSD 200 performs selection of a TDD configuration. That is to say, in the second modified example, among the functions of the AGLE 100, the function of the configuration selection unit 137 is provided in the master WSD 200 instead of the AGLE 100. An example of a communication control process according to the second modified example will be described below with reference to FIG. 16.

Figure 16:
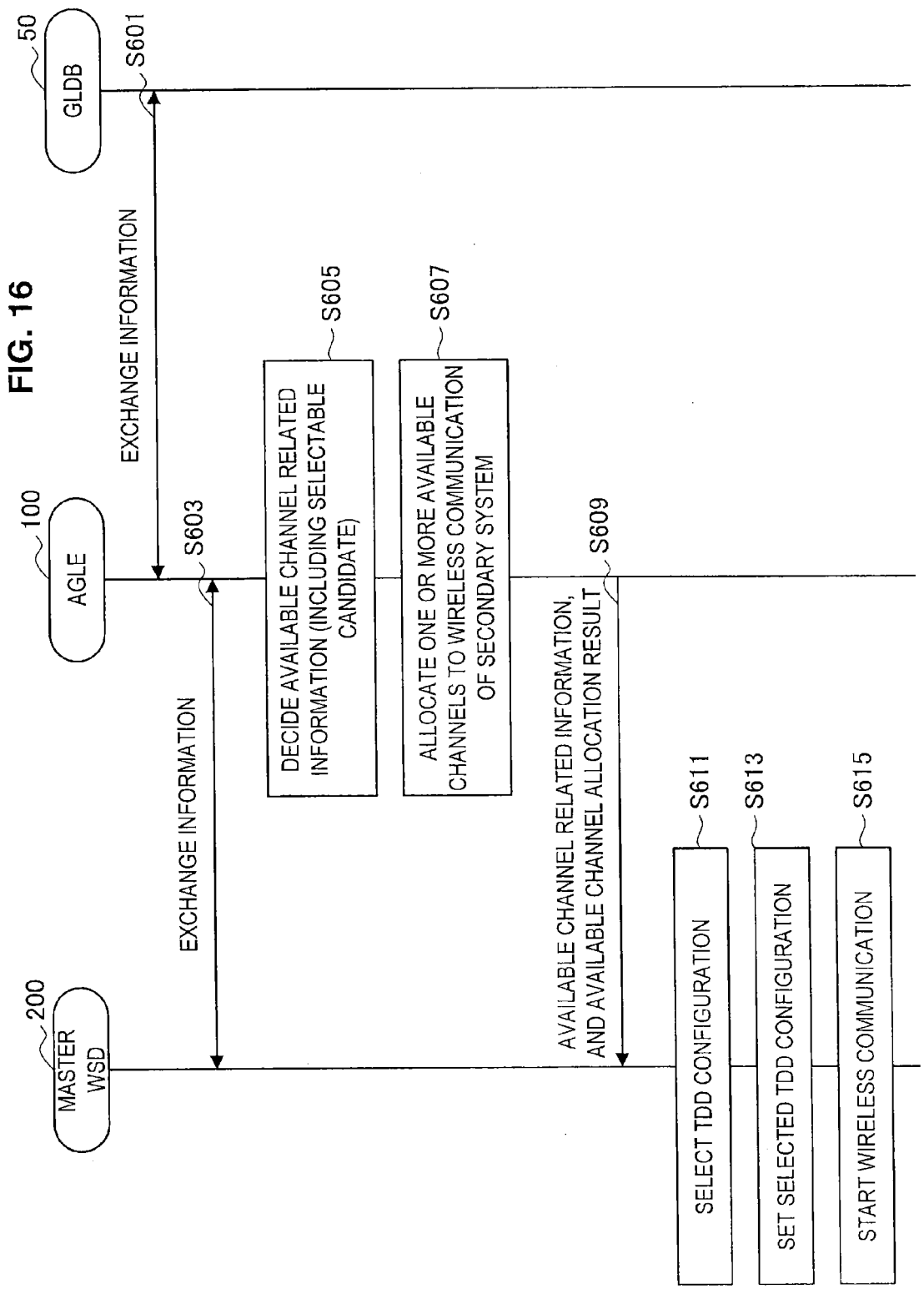
FIG. 16 is a sequence diagram illustrating an example of the schematic flow of a communication control process according to a second modified example of an embodiment.

FIG. 16 is a sequence diagram illustrating an example of the schematic flow of the communication control process according to the second modified example of the embodiment. It should be noted that Steps S601 to S607, S613, and S615 are the same as Steps S401 to S407, S413, and S415 of the communication control process described with reference to FIG. 14. Thus, only Steps S609 and S611 will be described herein.

The AGLE 100 notifies the master WSD 200 of the available channel related information and the available channel allocation result (Step S609).

After that, the master WSD 200 selects a TDD configuration for wireless communication of the individual available channels among the plurality of candidates for the TDD configuration for each of the allocated available channels (Step S611).

As described above, according to the second modified example, the selection of a TDD configuration is performed by the macro WSD 200. It should be noted that, in such a case, decision of selectable candidates and/or allocation of available channels may be further performed by the GLDB 50.

5.3. Third Modified Example

In the examples of the embodiment described above, the techniques for suppressing or avoiding interference of the primary system in the secondary system under management of one GLDB 50 that corresponds to one country have been described. However, when the secondary system (for example, the master WSD 200) is positioned near a boundary between countries, there is a possibility of the secondary system being affected by primary systems of the different countries. That is to say, there is a possibility of a primary system of a certain country interfering with a secondary system of another country.

Thus, in the third modified example of the present embodiment, not only a primary system under management of one GLDB 50 that corresponds to one country but also a primary system under management of a GLDB 50 that corresponds to another country is taken into account. That is to say, a technique for suppressing or avoiding interference from the primary system under management of the GLDB 50 that corresponds to the other country in a secondary system is provided.

Figure 17:
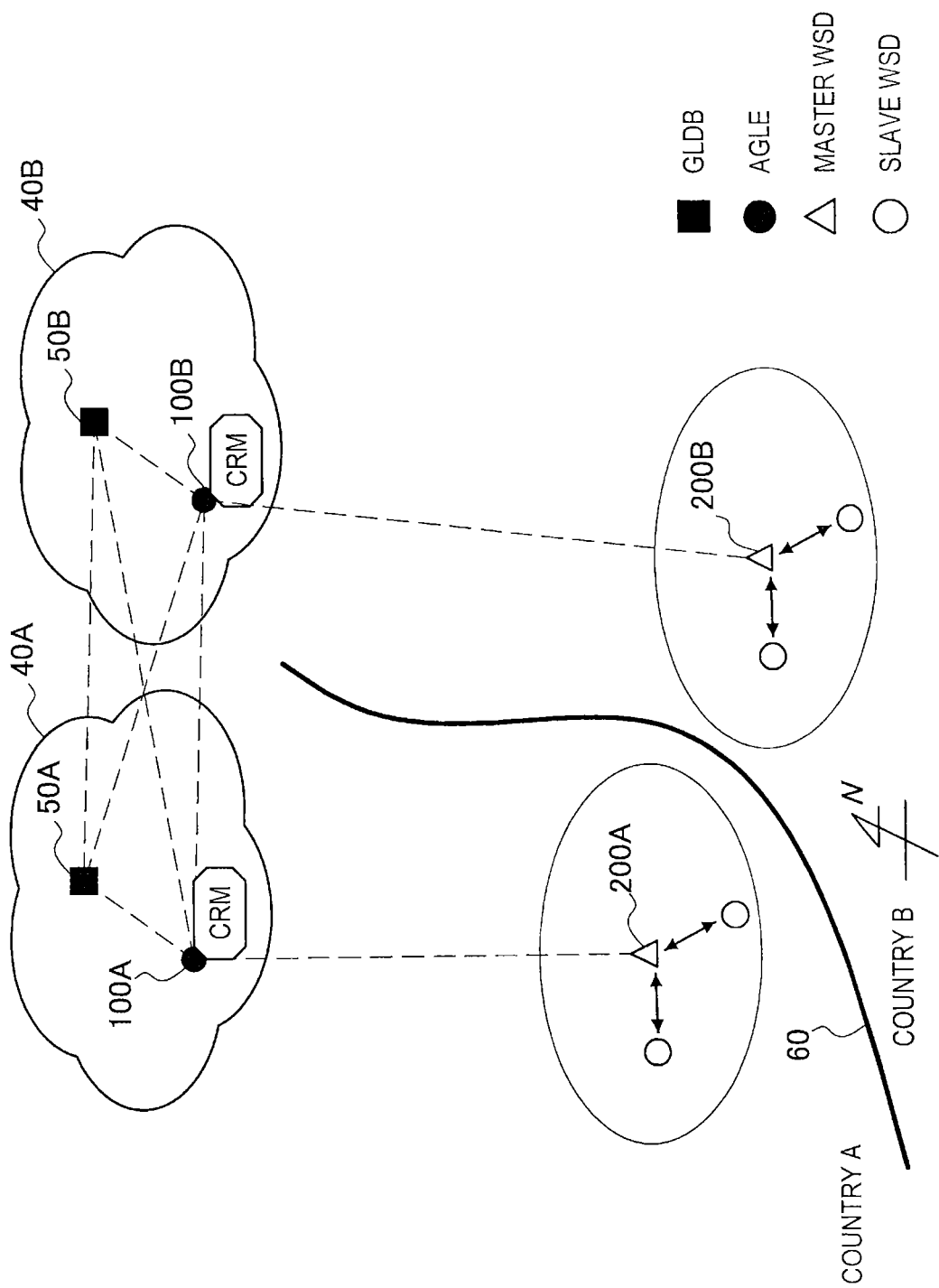
FIG. 17 is an illustrative diagram for describing an example of disposition of each device which is a premise of a third embodiment.

Example of Disposition of Each Device According to the Third Modified Example First, an example of disposition of each device that is a premise of a third embodiment will be described with reference to FIG. 17. FIG. 17 is an illustrative diagram for describing the example of disposition of each device that is the premise of the third embodiment. Referring to FIG. 17, a boundary 60 between a country A and a country B is shown. The boundary 60 may not necessarily coincide with a border, and may be flexibly set from the perspective of management of frequency bands. In addition, the third modified example can be widely applied to control of secondary use not only at a boundary between countries but also at a boundary between other types of regions that can include communities, states, prefectures, or the like.

A GLDB 50A is a regulatory database that manages data of frequency channels managed by the country A. In addition, an AGLE 100A is a secondary system management node operated by a frequency managing agent or a third party in the country A. On the other hand, a GLDB 50B is a regulatory database that manages data of frequency channels managed by the country B. In addition, an AGLE SOB is a secondary system management node operated by a frequency managing agent or a third party in the country B.

A master WSD 200A is a device that operates a secondary system near the boundary 60 in a region of the country A. A master WSD 200B is a device that operates a secondary system near the boundary 60 in a region of the country B. There is a possibility of the master WSD 200A of the country A being influenced not only by a primary system of the country A but also by a primary system of the country B. In addition, similarly, there is a possibility of the master WSD 200B of the country B being influenced not only by the primary system of the country B but also by the primary system of the country A.

For this reason, in the third embodiment, as a control entity for suppressing or avoiding such influence, a Coordinated Resource Management (CRM) is provided. The CRM verifies whether a primary system of a country influences a secondary system of another country, and performs adjustment relating to available channels when necessary. In the example illustrated in FIG. 17, the CRM is installed as a part of each AGLE 100.

Flow of a Process

Figure 18A:
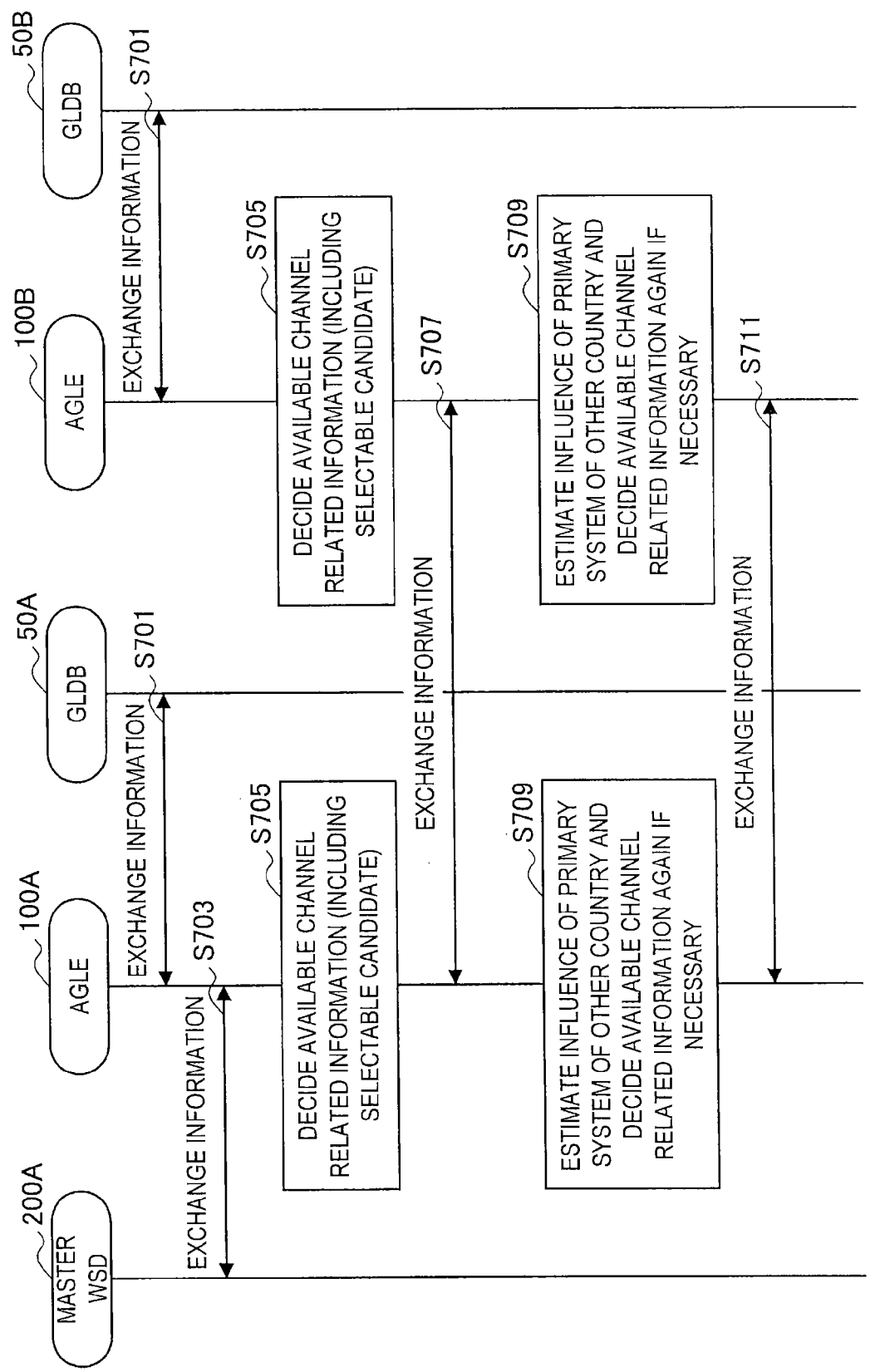
FIG. 18A is a first sequence diagram illustrating an example of the schematic flow of a communication control process according to a third modified example of an embodiment.

Next, an example of a communication control process according to the third modified example of the embodiment will be described with reference to FIGS. 18A and 18B. FIGS. 18A and 18B are sequence diagrams illustrating an example of the schematic flow of the communication control process according to the third modified example of the embodiment.

First, the GLDB 50A and the AGLE 100A exchange information in a cyclic manner or according to a predetermined trigger (Step S701). Similarly, the GLDB 50B and the AGLE 100B also exchange information in a cyclic manner or according to a predetermined trigger. The exchanged information here is as described relating to Step S401 shown in FIG. 14.

In addition, the AGLE 100A and the master WSD 200A exchange information in a cyclic manner or according to a predetermined trigger (Step S703). Similarly, the AGLE 100B and the master WSD 200B also exchange information in a cyclic manner or according to a predetermined trigger. The exchanged information here is as described relating to Step S403 shown in FIG. 14.

In addition, the AGLE 100A decides information relating to available channels (i.e., available channel related information) for the secondary system in the country A (Step S705). Similarly, the AGLE 100B also decides information relating to available channels (i.e., available channel related information) for the secondary system in the country B. The decided available channel related information includes information of one or more selectable candidates (TDD configurations).

Particularly, in the third modified example, the AGLE 100A and the AGLE 100B exchange information (Step S707). The exchanged information here includes part or all of the information exchanged in Steps S701 and S703.

Then, each of the AGLE 100A and the AGLE 100B checks whether there is a primary system that is a primary system of another country whose presence is not known and has influence on the secondary system of its own country. Then, when there is such a primary system, the AGLE 100 estimates influence from the primary system on the secondary system (for example, a level of interference). When the influence is equal to or greater than a predetermined level, the AGLE 100 modifies the available channel information, and makes a decision again (Step S709). The fixing of the available channel information may be, for example, a change of selectable candidates for a TDD configuration, a reduction in the bandwidth of the available channels that receive the influence, or deletion of the available channels.

After that, the AGLE 100A and the AGLE 100B exchange information again (Step S711). The exchanged information here includes, for example, the re-decided available channel related information. Then, the AGLE 100A and the AGLE 100B each confirm the re-decision of the available channel related information and reach an agreement.

Then, in Step S721 to Step S729, the same processes as Steps S407 to S415 described with reference to FIG. 14 are performed.

It should be noted that the process of Step S713 may be performed by only one of the AGLE 100A and the AGLE 100B rather than both. In this case, which of the AGLE 100A and the AGLE 100B will perform the process may be decided based on a load of the process on each of the devices, or may be randomly decided. In addition, the process may be performed alternately by the AGLE 100A and the AGLE 100B.

In addition, a frequency channel that is dedicated to avoiding the problem of interference near the boundary 60 may be secured. In this case, when influence of the primary system on the secondary system reaches a predetermined level or higher in Step S713, use of the dedicated frequency channel may be permitted.

Example of Disposition of Other CRMs

In the example described above, the CRM is disposed in the AGLEs 100. However, disposition of the CRM according to the third embodiment is not limited to the example. A specific example of this subject will be described below with reference to FIGS. 19 and 20.

Figure 19:
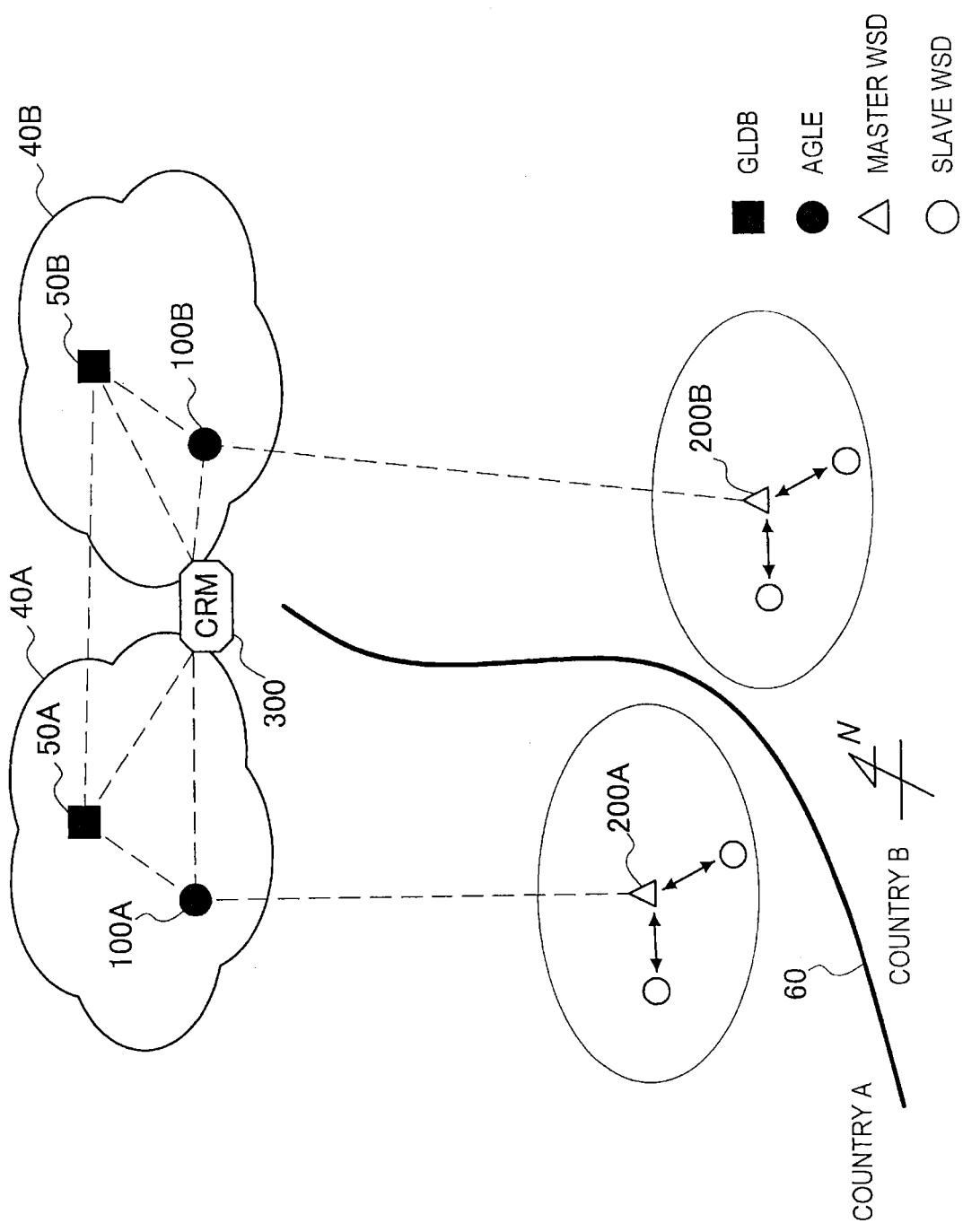
FIG. 19 is an illustrative diagram for describing another example of disposition of a CRM.

FIG. 19 is an illustrative diagram for describing another example of disposition of a CRM. Referring to FIG. 19, the GLDB 50A and AGLE 100A, and the GLDB 50B and AGLE 100B are as illustrated in FIG. 17. A CRM 300 is installed as a physically independent device from the GLDBs 50 and AGLEs 100 as illustrated in FIG. 19, and it may be communicably connected to the GLDBs 50 and AGLEs 100.

This CRM 300, for example, exchanges information with the AGLE 100A and AGLE 100B (and the GLDB 50A and GLDB 50B), and checks whether there is a primary system of another country that has influence on a secondary system of one country. Then, when there is such a primary system, the CRM 300 estimates the influence of the primary system on the secondary system (for example, a level of interference). When the influence is equal to or greater than a predetermined level, the CRM 300 modifies the available channel information and makes a decision again.

Figure 20:
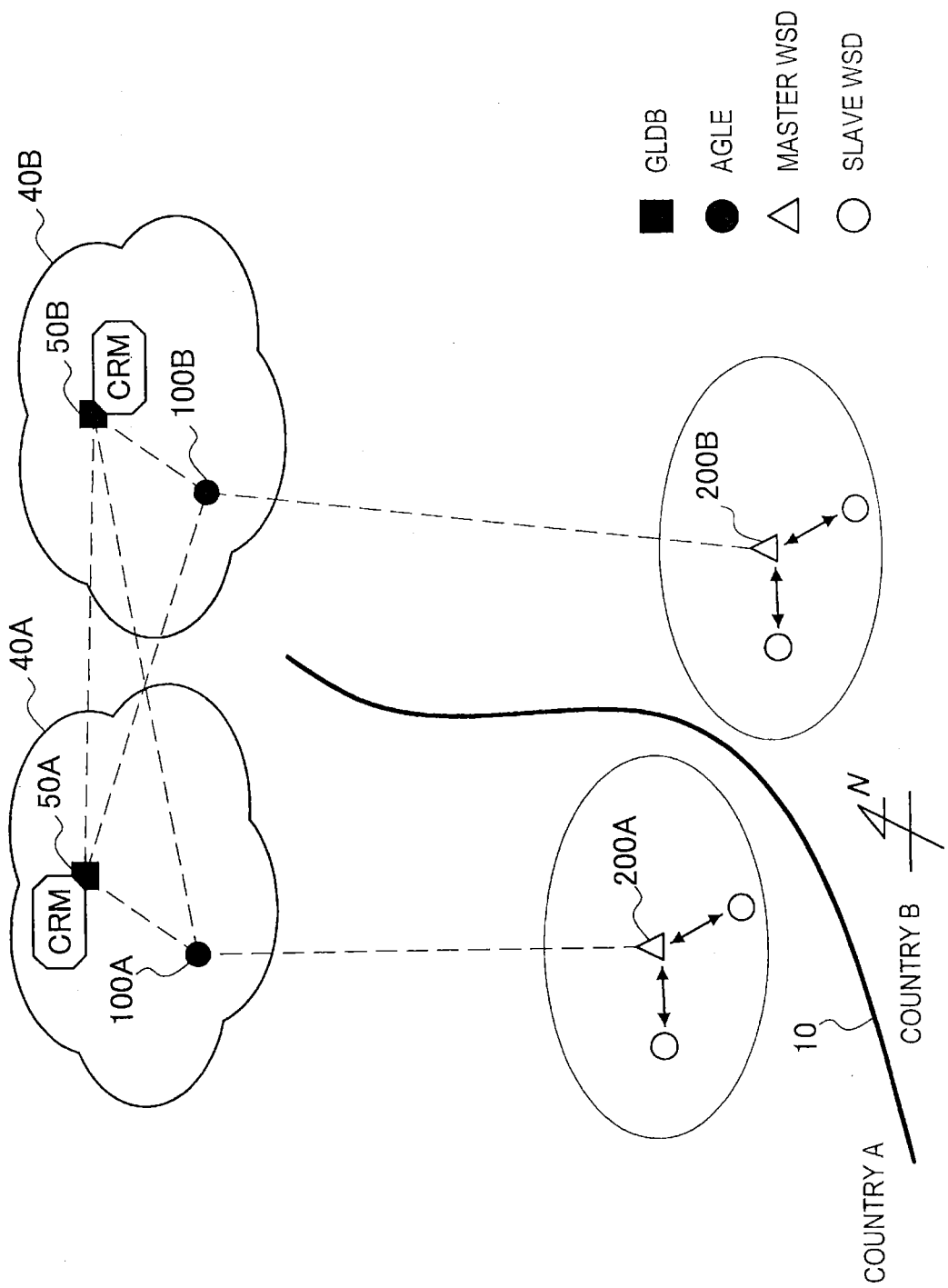
FIG. 20 is an illustrative diagram for describing still another example of disposition of CRMs.

FIG. 20 is an illustrative diagram for describing still another example of disposition of CRMs. Referring to FIG. 20, the GLDB 50A and AGLE 100A, and the GLDB 50B and AGLE 100B are as illustrated in FIG. 17. As illustrated in FIG. 20, the CRMs may be installed as a part of each GLDB 50.

The GLDB 50 that includes such a CRM in a part thereof checks, for example, whether there is a primary system of another country that has influence on a secondary system of one country. Then, when there is such a primary system, the GLDB 50 estimates the influence of the primary system on the secondary system (for example, a level of interference). When the influence is equal to or greater than a predetermined level, the GLDB 50 modifies the available channel information and makes a decision again.

The third modified example of the embodiment has been described above. According to the third modified example of the embodiment, not only interference of a primary system of a country but also interference of a primary system of another country is suppressed or avoided.

5.4. Fourth Modified Example

The embodiments have mainly been described in the context of TV white spaces so far. However, the technology according to the embodiments is not limited thereto.

For example, in review of a fifth generation (5G) wireless communication scheme since 3GPP Release 12, overlapping a macro cell and a small cell has been proposed in order to improve communication capacities (NTT DOCOMO, INC., "Requirements, Candidate Solutions & Technology Roadmap for LTE Rel-12 Onward," 3GPP Workshop on Release 12 and onwards, Ljubljana, Slovenia, Jun. 11 to 12, 2012). The technology of the embodiments can also be applied to a case in which interference between a macro cell and a small cell can occur. That is to say, the target wireless communication may be wireless communication of a small cell that is partly or entirely overlapped by a macro cell, and an interference frequency channel may be a frequency channel used in the macro cell.

In addition, the technology according to the embodiments can also be applied to a case of LSA that is based on the premise of infrastructure sharing. In addition, the technology according to the embodiments can also be applied to a cell case in which interference between a system operated by a mobile virtual network operator (MVNO) and/or a mobile virtual network enabler (MVNE) and a system operated by a mobile network operator (MNO) can occur. In addition, the technology according to the embodiments can also be applied to a case to which Multimedia Broadcast Multicast Service (MBMS) is applied. Specifically, for example, when the same signal is transmitted from a plurality of base stations at once in a synchronized manner using an MBMS single frequency network (MBSFN) transmission scheme, a TDD configuration dedicated to a downlink may be applied to wireless communication of (a plurality of) frequency channels. In this case, a process relating to allocation of uplink channels may be omitted.

It should be noted that which system or cell is to be set as an interfering side and which system or cell is to be set to receive interference may be decided according to the priority of each communication link. The priority can be specified based on a QoS requirement or defined in advance.

6. Application Examples

The technology of the present disclosure is applicable to various products. For example, each of the AGLE 100 and the GLDB 50 may be realized as any type of server such as a tower server, a rack server, and a blade server. Each of the AGLE 100 and the GLDB 50 may be a control module (such as an integrated circuit module including a single die, and a card or a blade that is inserted into a slot of a blade server) mounted on a server.

For example, the master WSD 200 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the master WSD 200 may be realized as any other types of base stations such as a NodeB and a base transceiver station (BTS). The master WSD 200 may include a main body (that is also referred to as a base station apparatus) configured to control wireless communication, and one or more remote radio heads (RRH) disposed in a different place from the main body. Additionally, various types of terminals to be described below may also operate as the master WSD 200 by temporarily or semi-permanently executing a base station function.

For example, the slave WSD 300 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The slave WSD 300 may also be realized as a terminal that performs machine-to-machine (M2M) communication (that is also referred to as a machine type communication (MTC) terminal). Furthermore, the slave WSD 300 may be a wireless communication module (such as an integrated circuit module configured with a single die) mounted on each of the terminals.

6.1. Application Example of an AGLE and a GLDB

Figure 21:
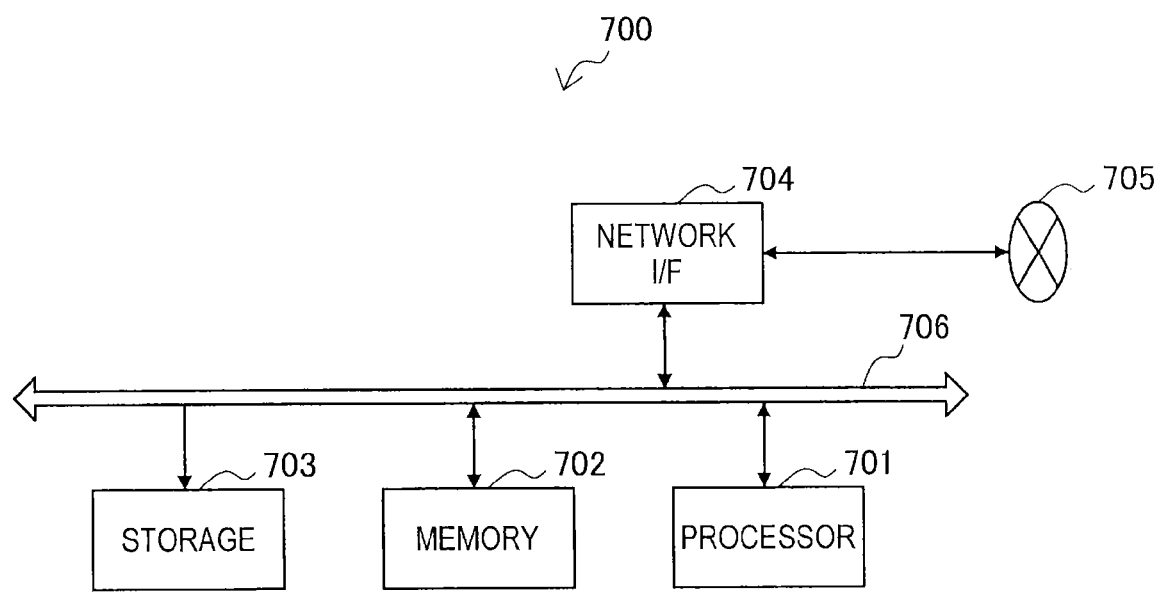
FIG. 21 is a block diagram illustrating an example of a schematic configuration of a server to which the technology according to the present disclosure can be applied.

FIG. 21 is a block diagram illustrating an example of a schematic configuration of a server 750 to which the technology of the present disclosure may be applied. The server 750 includes a processor 751, a memory 752, a storage 753, a network interface 754, and a bus 756.

The processor 751 may be, for example, a central processing unit (CPU) or a digital signal processor (DSP), and controls functions of the server 750. The memory 752 includes a random access memory (RAM) and a read only memory (ROM), and stores a program that is executed by the processor 751 and data. The storage 753 may include a storage medium such as a semiconductor memory and a hard disk.

The network interface 754 is a wired communication interface for connecting the server 750 to a wired communication network 755. The wired communication network 755 may be a core network such as an Evolved Packet Core (EPC), or a packet data network (PDN) such as the Internet.

The bus 756 connects the processor 751, the memory 752, the storage 753, and the network interface 754 to each other. The bus 756 may include two or more buses (such as a high speed bus and a low speed bus) each of which has different speed.

In the server 750 illustrated in FIG. 21, the configuration selection unit 137 and the configuration application unit 139 described referring to FIG. 9 may be implemented by the processor 751. In addition, the channel recognition unit 132 and the selectable candidate decision unit 133 described referring to FIG. 9 may be implemented by the processor 751.

6.2. Application Example of a Master WSD

First Application Example

Figure 22:
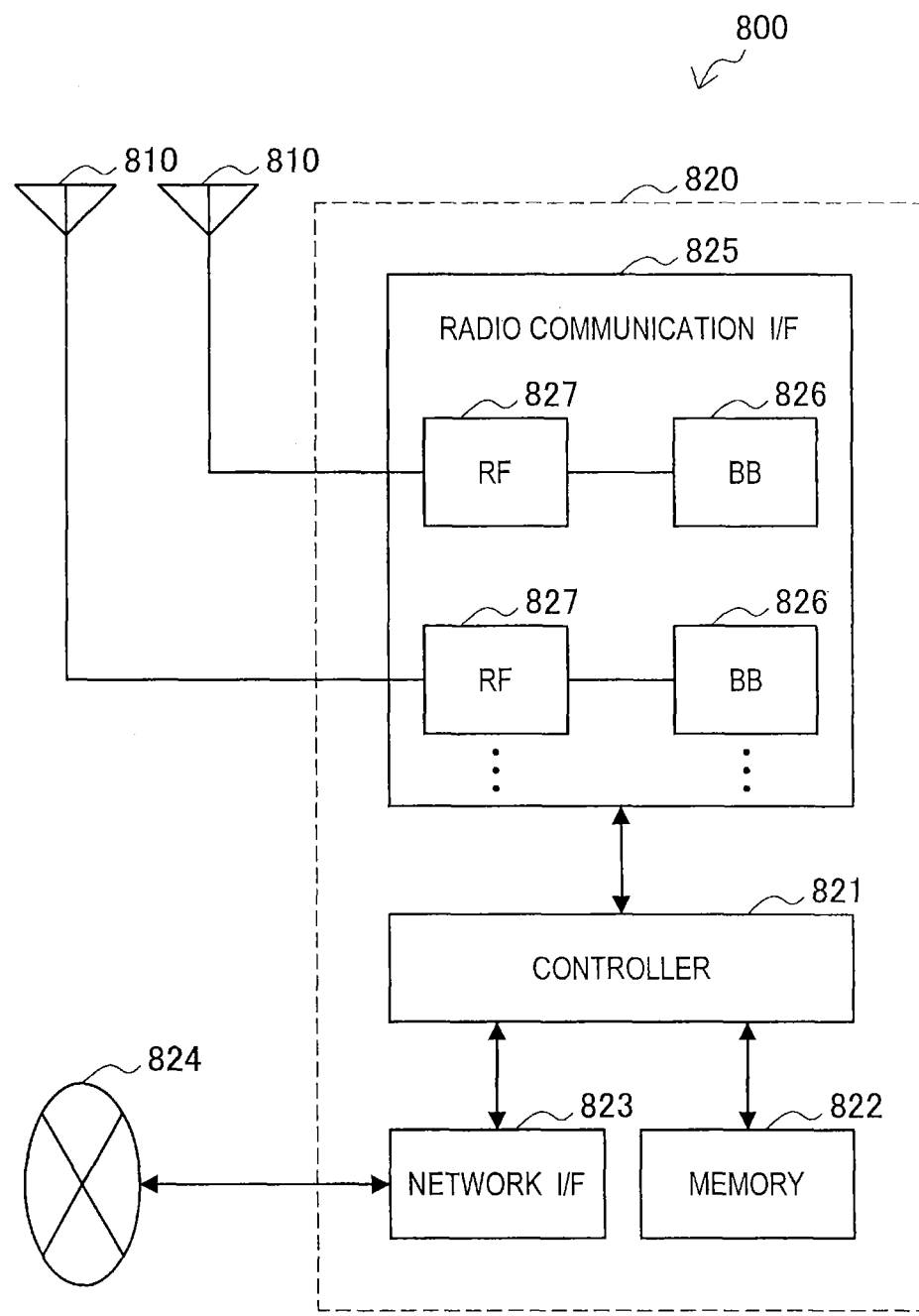
FIG. 22 is a block diagram illustrating a first example of a schematic configuration of an eNB to which the technology according to the present disclosure can be applied.

FIG. 22 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (such as a plurality of antenna elements included in an MIMO antenna), and is used for the base station apparatus 820 to transmit and receive radio signals. The eNB 800 may include the plurality of antennas 810, as illustrated in FIG. 22. For example, the plurality of antennas 810 may each correspond to a plurality of frequency bands used by the eNB 800. Although FIG. 22 illustrates the example in which the eNB 800 includes the plurality of antennas 810, the eNB 800 may also include a single antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from a plurality of base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an SI interface and an X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the plurality of BB processors 826 as illustrated in FIG. 22. For example, the plurality of BB processors 826 may each correspond to a plurality of frequency bands used by the eNB 800. The wireless communication interface 825 may include the plurality of RF circuits 827 as illustrated in FIG. 22. For example, the plurality of RF circuits 827 may each correspond to a plurality of antenna elements. Although FIG. 22 illustrates the example in which the wireless communication interface 825 includes the plurality of BB processors 826 and the plurality of RF circuits 827, the wireless communication interface 825 may also include a single BB processor 826 or a single RF circuit 827.

Second Application Example

Figure 23:
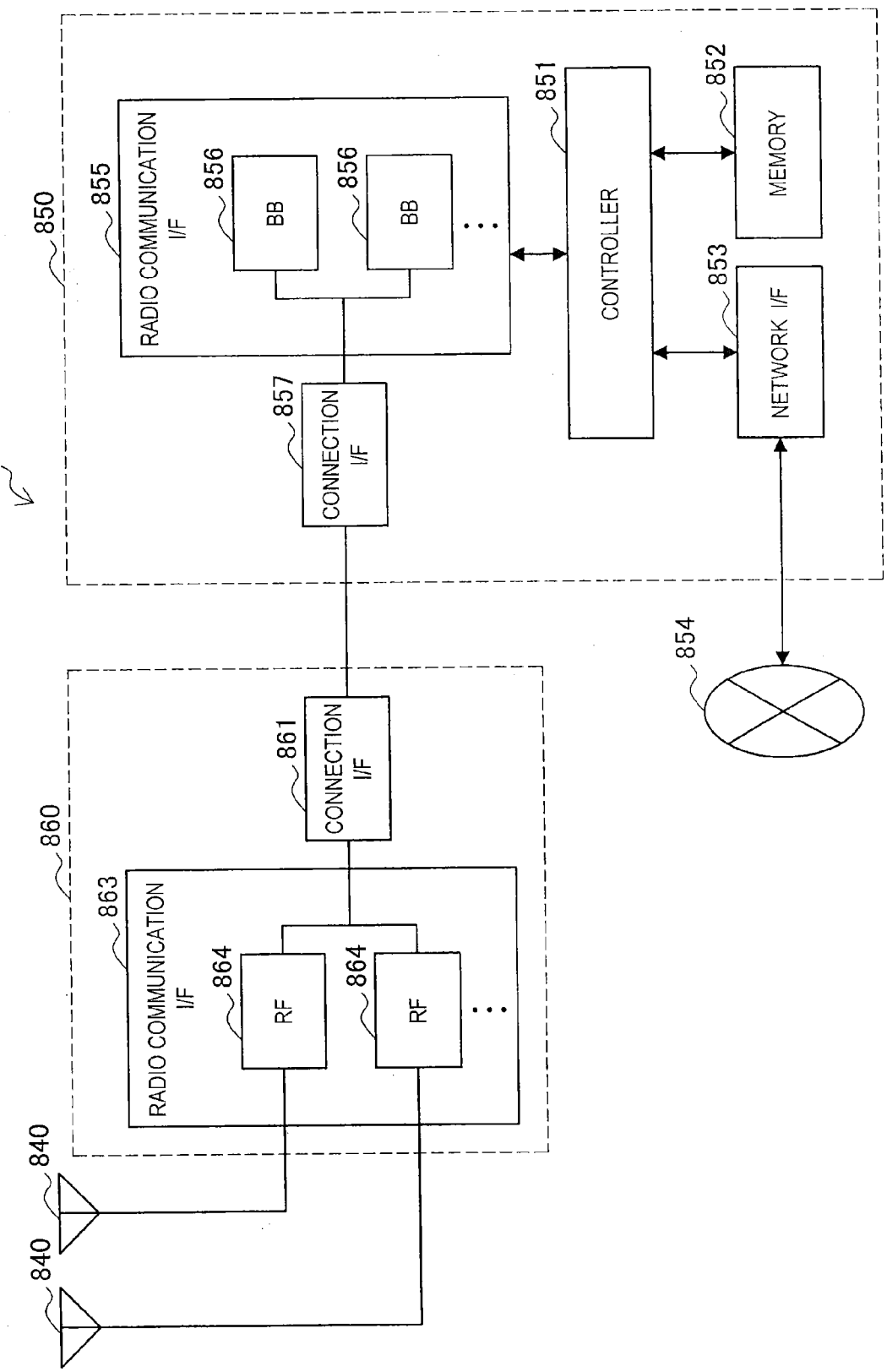
FIG. 23 is a block diagram illustrating a second example of the schematic configuration of the eNB to which the technology according to the present disclosure can be applied.

FIG. 23 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or a plurality of antenna elements (such as a plurality of antenna elements included in an MIMO antenna), and is used for the RRH 860 to transmit and receive radio signals. The eNB 830 may include the plurality of antennas 840 as illustrated in FIG. 23. For example, the plurality of antennas 840 may each correspond to a plurality of frequency bands used by the eNB 830. Although FIG. 23 illustrates the example in which the eNB 830 includes the plurality of antennas 840, the eNB 830 may also include a single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 22.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 22, except that the BB processor 856 is connected to the RF circuit 864 of the RRH 860 via the connection interface 857. The wireless communication interface 855 may include the plurality of BB processors 856, as illustrated in FIG. 23. For example, the plurality of BB processors 856 may each correspond to a plurality of frequency bands used by the eNB 830. Although FIG. 23 illustrates the example in which the wireless communication interface 855 includes the plurality of BB processors 856, the wireless communication interface 855 may also include a single BB processor 856.

The connection interface 857 is an interface for connecting the base station apparatus 850 (wireless communication interface 855) to the RRH 860. The connection interface 857 may also be a communication module for communication in the above-described high speed line that connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include a plurality of RF circuits 864, as illustrated in FIG. 23. For example, the plurality of RF circuits 864 may each correspond to a plurality of antenna elements. Although FIG. 23 illustrates the example in which the wireless communication interface 863 includes the plurality of RF circuits 864, the wireless communication interface 863 may also include a single RF circuit 864.

In the eNB 800 and the eNB 830 illustrated in FIGS. 22 and 23, the configuration selection unit 253 and the configuration application unit 255 described by using FIG. 12 may be implemented by the wireless communication interface 825 and the wireless communication interface 855, and/or the wireless communication interface 863. At least a part of the functions may also be implemented by the controller 821 and the controller 851.

6.3. Application Example of a Slave WSD

First Application Example

Figure 24:
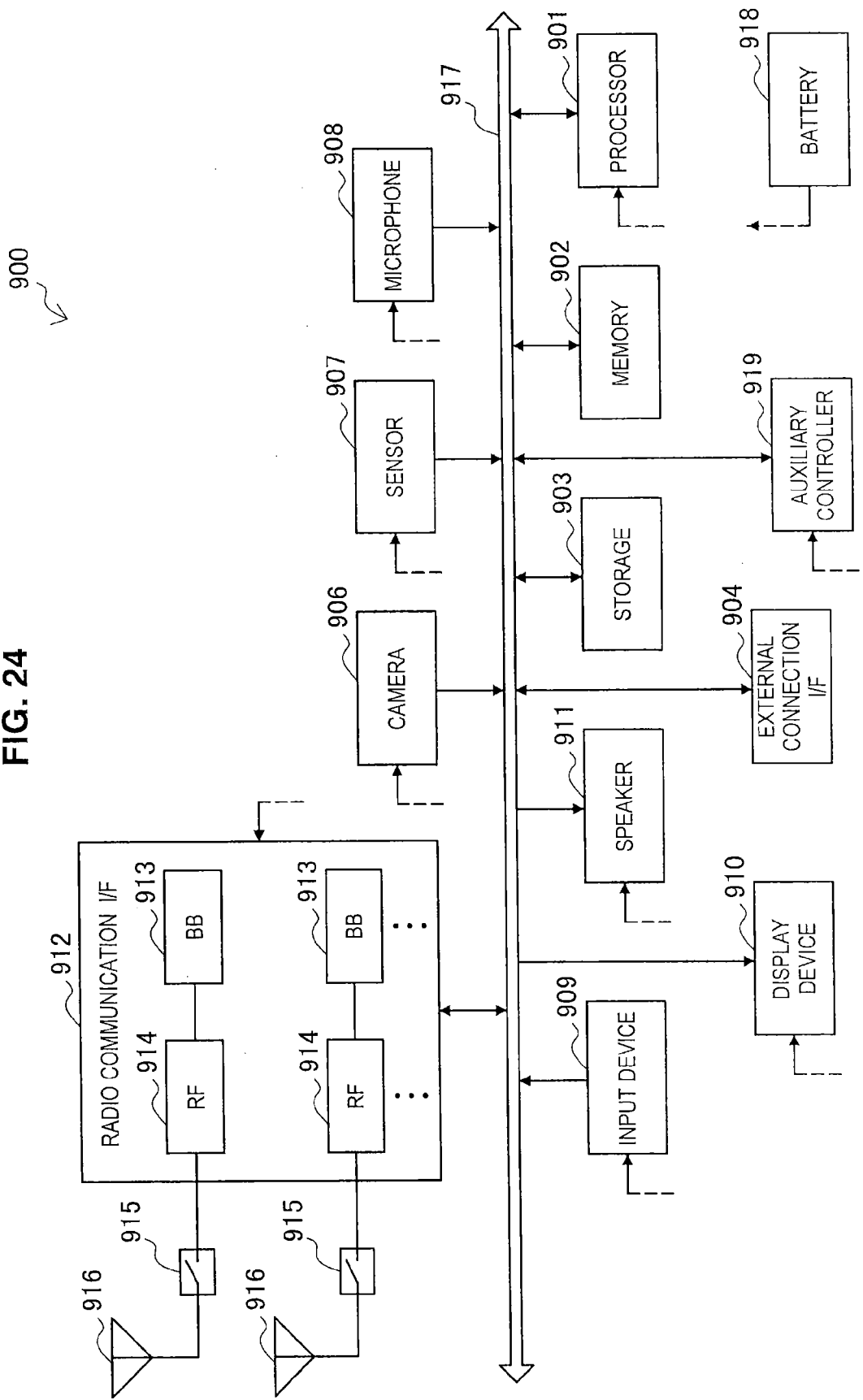
FIG. 24 is a block diagram illustrating an example of a schematic configuration of a smartphone to which the technology according to the present disclosure can be applied.

FIG. 24 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system-on-chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device such as a memory card or a universal serial bus (USB) device to the smartphone 900.

The camera 906 includes an image sensor such as a charge coupled device (CCD) or a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one-chip module that has the BB processor 913 and the RF circuit 914 integrated thereon. The wireless communication interface 912 may include a plurality of BB processors 913 and a plurality of RF circuits 914, as illustrated in FIG. 24. Although FIG. 24 illustrates the example in which the wireless communication interface 912 includes the plurality of BB processors 913 and the plurality of RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, or a wireless local area network (LAN) scheme. In that case, the wireless communication interface may include the BB processor 913 and the RF circuit 914 for each wireless communication scheme.

Each of the antenna switches 915 switches connection destinations of the antennas 916 among a plurality of circuits (such as circuits for different wireless communication schemes) included in the wireless communication interface 912.

Each of the antennas 916 includes a single or a plurality of antenna elements (such as a plurality of antenna elements included in an MIMO antenna), and is used for the wireless communication interface 912 to transmit and receive radio signals. The smartphone 900 may include the plurality of antennas 916, as illustrated in FIG. 24. Although FIG. 24 illustrates the example in which the smartphone 900 includes the plurality of antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each of the blocks of the smartphone 900 illustrated in FIG. 24 via feeder lines, which are partially shown as dashed lines in the figure. The auxiliary controller 919 operates minimum necessary functions of the smartphone 900, for example, in a sleep mode.

In the smartphone 900 illustrated in FIG. 24, the configuration recognition unit 343 and the communication control unit 345 described by using FIG. 13 may be implemented by the wireless communication interface 912. At least a part of the functions may also be implemented by the processor 901 and the auxiliary controller 919.

Second Application Example

FIG. 25 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD or a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as an LCD or an OLED display, and displays an image of the navigation function or reproduced content. The speaker 931 outputs sounds of the navigation function or the reproduced content.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include a plurality of BB processors 934 and a plurality of RF circuits 935, as illustrated in FIG. 25. Although FIG. 25 illustrates the example in which the wireless communication interface 933 includes the plurality of BB processors 934 and the plurality of RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, or a wireless LAN scheme. In that case, the wireless communication interface may include the BB processor 934 and the RF circuit 935 for each wireless communication scheme.

Each of the antenna switches 936 switches connection destinations of the antennas 937 among a plurality of circuits (such as circuits for different wireless communication schemes) included in the wireless communication interface 933.

Each of the antennas 937 includes a single or a plurality of antenna elements (such as a plurality of antenna elements included in an MIMO antenna), and is used for the wireless communication interface 933 to transmit and receive radio signals. The car navigation apparatus 920 may include the plurality of antennas 937, as illustrated in FIG. 25. Although FIG. 25 illustrates the example in which the car navigation apparatus 920 includes the plurality of antennas 937, the car navigation apparatus 920 may also include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to each of the blocks of the car navigation apparatus 920 illustrated in FIG. 25 via feeder lines that are partially shown as dashed lines in the figure. The battery 938 accumulates power supplied form the vehicle.

In the car navigation apparatus 920 illustrated in FIG. 25, the configuration recognition unit 343 and the communication control unit 345 described by using FIG. 13 may be implemented by the wireless communication interface 933. At least a part of the functions may also be implemented by the processor 921.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine RPM, or trouble information, and outputs the generated data to the in-vehicle network 941.

7. Conclusion

The communication devices and each process according to the embodiments of the present disclosure have been described above using FIGS. 1 to 20. According to the embodiments of the present disclosure, a TDD configuration for wireless communication is selected among a plurality of candidates for the TDD configuration. Then, the selected TDD configuration is applied to the wireless communication. In addition, the plurality of candidates include at least one of a TDD configuration dedicated to a downlink and a TDD configuration dedicated to an uplink.

Accordingly, even when there are a transmitter and a receiver which use the same or close frequency bands, more desirable wireless communication can be performed through the receiver.

In addition, for example, the plurality of candidates include a TDD configuration dedicated to a downlink.

Accordingly, even for an available channel adjacent to the primary channel, interference of the primary system can be further suppressed. That is to say, even for an available channel adjacent to the primary channel, a decrease of the SINR can be further suppressed.

In addition, for example, the plurality of candidates include a TDD configuration dedicated to an uplink.

Accordingly, even when the bandwidth of secondary channels that are away from the primary channel is narrow (or the number of secondary channels is small), many radio resources for the uplink can be secured. For this reason, the throughput of the uplink can be improved.

In addition, for example, the plurality of candidates include both a TDD configuration dedicated to a downlink and a TDD configuration dedicated to an uplink.

In this case, even in a wireless communication system that employs TDD as a duplex scheme, the same wireless communication as when FDD is employed as a duplex scheme can be performed temporarily and/or on some frequency channels. As a result, the throughput of the uplink can be improved while suppressing interference of the primary channel.

In addition, for example, for each frequency channel included in the two or more frequency channels, one or more candidates selectable to be applied to wireless communication of each of the frequency channels (i.e., selectable candidates) are decided among a plurality of candidates for a TDD configuration. In addition, the one or more selectable candidates are decided based on information relating to the distance between an interference frequency channel on which an interference signal is transmitted and each of the frequency channels in the frequency direction (i.e., distance related information).

Accordingly, the throughput can be improved while suppressing the influence of interference.

In addition, for example, when the distance between the interference frequency channel and each of the frequency channels is shorter than the distance $D_1$, the one or more selectable candidates include a TDD configuration dedicated to a downlink.

Accordingly, for an available channel that is close to the primary channel (interference frequency channel), a TDD configuration having only downlink sub-frames (a TDD configuration with no uplink sub-frames) is selected and applied. As a result, only downlink wireless communication is performed on the available channel, without performing uplink wireless communication. For this reason, interference in the available channel is suppressed. That is to say, a decrease of the SINR of the available channel is suppressed.

In addition, for example, when the distance between the interference frequency channel and each of the frequency channels is longer than the distance $D_2$, the one or more selectable candidates include a TDD configuration dedicated to an uplink.

Accordingly, for an available channel that is away from the primary channel (interference frequency channel), a TDD configuration having only uplink sub-frames is selectable. For this reason, with the selection of the TDD configuration, even when the bandwidth of the available channel (or the sum of the bandwidths of all available channels) is narrow, the throughput of the uplink in the secondary system can be improved.

In addition, for example, when the distance between the interference frequency channel and each of the frequency channels in the frequency direction is even longer, the one or more selectable candidates include a TDD configuration having a larger number of uplink sub-frames.

Accordingly, when an available channel is farther from the primary channel (interference frequency channel), the TDD configuration having a larger number of uplink sub-frames can be selected for the available channel. On the other hand, when an available channel is closer to the primary channel (interference frequency channel), only a TDD configuration having a smaller number of uplink sub-frames can be selected for the available channel. For this reason, with the selection of the TDD configurations, interference in the available channel is suppressed. That is to say, a decrease of the SINR of the available channel is suppressed.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Processing steps in the communication control process in the present specification do not necessarily have to be performed in the chronological order described in the flowcharts. For example, the processing steps in the communication control process may be performed in order different from the order described as the flowcharts, or may be performed in parallel.

It is also possible to create a computer program for causing hardware such as a CPU, ROM, and RAM built in a communication control device (such as the GLDB, the AGLE, and the master MSD) and a communication device (such as a the slave WSD) to exhibit functions similar to each structural element of the communication control device and the communication device. There is also provided a storage medium having the computer program stored therein.

Additionally, the present technology may also be configured as below.

(1)

A communication control device that controls wireless communication in compliance with a time division duplex (TDD) scheme, the communication control device including:

a selection unit configured to select a link direction configuration for the wireless communication among a plurality of candidates for the link direction configuration which indicates a link direction in units of sub-frames of a radio frame which includes a plurality of sub-frames; and an application unit configured to apply the selected link direction configuration to the wireless communication, wherein the plurality of candidates include at least one of a link direction configuration dedicated to a downlink and a link direction configuration dedicated to an uplink.

(2)

The communication control device according to (1), wherein the plurality of candidates include the link direction configuration dedicated to a downlink.

(3)

The communication control device according to (1) or (2), wherein the plurality of candidates include the link direction configuration dedicated to an uplink.

(4)

The communication control device according to (3), wherein the link direction configuration dedicated to an uplink includes a link direction configuration in which uplink transmission is not performed in a part or all of a first sub-frame among the plurality of sub-frames.

(5)

The communication control device according to any one of (1) to (4), wherein, when the wireless communication is performed on two or more frequency channels, the selection unit selects a link direction configuration for wireless communication of each of the frequency channels from the plurality of candidates for each of the frequency channels that are included in the two or more frequency channels, and wherein the application unit applies the link direction configuration selected for each of the frequency channels to wireless communication of each of the frequency channels.

(6)

The communication control device according to (5), wherein the selection unit selects the link direction configuration for the wireless communication of each of the frequency channels from one or more selectable candidates among the plurality of candidates, and wherein the one or more selectable candidates are decided based on information relating to the distance between an interference frequency channel on which an interference signal is transmitted and each of the frequency channels in a frequency direction.

(7)

The communication control device according to (6), wherein the one or more selectable candidates are decided based further on information relating to service quality desired for the wireless communication.

(8)

The communication control device according to (6) or (7), wherein, when the distance between the interference frequency channel and each of the frequency channels is shorter than a first distance, the one or more selectable candidates are the link direction configuration dedicated to a downlink.

(9)

The communication control device according to any one of (6) to (8), wherein, when the distance between the interference frequency channel and each of the frequency channels is longer than a second distance, the one or more selectable candidates include the link direction configuration dedicated to an uplink.

(10)

The communication control device according to any one of (6) to (9), wherein, when the distance between the interference frequency channel and each of the frequency channels is even longer, the one or more selectable candidates include a link direction configuration having the larger number of uplink sub-frames.

(11)

The communication control device according to any one of (5) to (10), wherein the two or more frequency channels include a first frequency channel that is closer to an interference frequency channel on which an interference signal is transmitted and a second frequency channel that is farther from the interference frequency channel, and wherein the selection unit selects a first link direction configuration of which the number of downlink sub-frames is a first number as a link direction configuration for wireless communication of the first frequency channel, and selects a second link direction configuration of which the number of downlink sub-frames is a second number that is smaller than the first number as a link direction configuration for wireless communication of the second frequency channel.

(12)

The communication control device according to any one of (5) to (11), wherein, when the distance between an interference frequency channel on which an interference signal is transmitted and each of the frequency channels in a frequency direction is shorter than a third distance, the selection unit selects the link direction configuration dedicated to a downlink as a link direction configuration for wireless communication of each of the frequency channels.

(13)

The communication control device according to any one of (1) to (12), wherein the wireless communication is performed on one or more frequency channels, and wherein the one or more frequency channels include a frequency channel that is a fourth distance or more apart from an interference frequency channel on which an interference signal is transmitted in a frequency direction.

(14)

The communication control device according to (13), wherein, when the wireless communication is a predetermined type of wireless communication, the selection unit selects a link direction configuration of which the number of uplink sub-frames is greater than a predetermined number as a link direction configuration for the frequency channel that is the fourth distance or more apart from the interference frequency channel.

(15)

The communication control device according to (14), wherein the predetermined type of wireless communication is machine-to-machine communication.

(16)

The communication control device according to any one of (6) to (15), wherein the wireless communication is wireless communication of a secondary system that secondarily uses a frequency channel for a primary system, and wherein the interference frequency channel is a frequency channel that is used in another wireless communication system different from the secondary system.

(17)

The communication control device according to any one of (6) to (15).

wherein the wireless communication is wireless communication of a small cell which is partly or entirely overlapped by a macro cell, and wherein the interference frequency channel is a frequency channel that is used in the macro cell.

(18)

A communication control method for controlling wireless communication in compliance with a time division duplex (TDD) scheme, the communication control method including:

selecting a link direction configuration for the wireless communication among a plurality of candidates for the link direction configuration which indicates a link direction in units of sub-frames of a radio frame which includes a plurality of sub-frames; and applying the selected link direction configuration to the wireless communication, wherein the plurality of candidates include at least one of a link direction configuration dedicated to a downlink and a link direction configuration dedicated to an uplink.

(19)

A communication control device including:

a recognition unit configured to recognize a frequency channel on which wireless communication is performed in compliance with a time division duplex (TDD) scheme; and a decision unit configured to, when the wireless communication is performed on two or more frequency channels, decide one or more candidates selectable to be applied to wireless communication of each of the frequency channels among a plurality of candidates for a link direction configuration that indicates a link direction in units of sub-frames of a radio frame that includes a plurality of sub-frames for each of the frequency channels included in the two or more frequency channels, on the basis of information relating to the distance between an interference frequency channel on which an interference signal is transmitted and each of the frequency channels in a frequency direction, wherein the plurality of candidates include at least one of a link direction configuration dedicated to a downlink and a link direction configuration dedicated to an uplink.

(20)

A communication device that controls wireless communication in compliance with a time division duplex (TDD) scheme, the communication device including:

a recognition unit configured to recognize a link direction configuration to be applied to the wireless communication among a plurality of candidates for the link direction configuration that indicates a link direction in units of sub-frames of a radio frame that includes a plurality of sub-frames; and a communication control unit configured to control the wireless communication in compliance with the recognized link direction configuration, wherein the plurality of candidates include at least one of a link direction configuration dedicated to a downlink and a link direction configuration dedicated to an uplink.

REFERENCE SIGNS LIST

50 GLDB (Geo-Location Database)
60 boundary
100 AGLE (Advanced Geo-Location Engine)
132 channel recognition unit
133 selectable candidate decision unit
137 configuration selection unit
139 configuration application unit
200 master WSD (White Space Device)
253 configuration selection unit
255 configuration application unit
300 slave WSD (White Space Device)
343 configuration recognition unit
345 communication control unit

The invention claimed is:

1. A communication control device that controls wireless communication in a wireless communication system that includes a primary system and a secondary system, the communication control device comprising:

a recognition unit configured to recognize a frequency channel on which wireless communication is performed in compliance with a time division duplex (TDD) scheme;

a selection unit configured to select a link direction configuration for the wireless communication among a plurality of candidates for the link direction configuration, each of the plurality of the candidates indicates a link direction in units of a subframe of a radio frame; and an application unit configured to apply the selected link direction configuration to the wireless communication, wherein the wireless communication is performed on one or more frequency channels of the secondary system, the one or more frequency channels including a first frequency channel that is used in a machine-to-machine communication, and when the wireless communication is for the machine-to-machine communication, the selection unit is configured to select a link direction configuration of which the number of uplink sub-frames is greater than a predetermined number as a link direction configuration for the first frequency channel.

2. The communication control device according to claim 1, wherein the plurality of candidates include the link direction configuration dedicated to a downlink.

3. The communication control device according to claim 1, wherein the plurality of candidates include the link direction configuration dedicated to an uplink.

4. The communication control device according to claim 3, wherein the link direction configuration dedicated to an uplink includes a link direction configuration in which uplink transmission is not performed in a part or all of a first sub-frame among the plurality of sub-frames.

5. The communication control device according to claim 1, wherein, when the wireless communication is performed on two or more frequency channels, the selection unit selects a link direction configuration for wireless communication of each of the frequency channels from the plurality of candidates for each of the frequency channels that are included in the two or more frequency channels, and wherein the application unit applies the link direction configuration selected for each of the frequency channels to wireless communication of each of the frequency channels.

6. The communication control device according to claim 5, wherein the selection unit selects the link direction configuration for the wireless communication of each of the frequency channels from one or more selectable candidates among the plurality of candidates, and wherein the one or more selectable candidates are decided based on information relating to the distance between an interference frequency channel on which an interference signal is transmitted and each of the frequency channels in a frequency direction.

7. The communication control device according to claim 6, wherein the one or more selectable candidates are decided based further on information relating to service quality desired for the wireless communication.

8. The communication control device according to claim 6, wherein, when the distance between the interference frequency channel and each of the frequency channels is shorter than a first distance, the one or more selectable candidates are the link direction configuration dedicated to a downlink.

9. The communication control device according to claim 6, wherein, when the distance between the interference frequency channel and each of the frequency channels is longer than a second distance, the one or more selectable candidates include the link direction configuration dedicated to an uplink.

10. The communication control device according to claim 6, wherein, when the distance between the interference frequency channel and each of the frequency channels is even longer, the one or more selectable candidates include a link direction configuration having the larger number of uplink sub-frames.

11. The communication control device according to claim 5, wherein the two or more frequency channels include a first frequency channel that is closer to an interference frequency channel on which an interference signal is transmitted and a second frequency channel that is farther from the interference frequency channel, and wherein the selection unit selects a first link direction configuration of which the number of downlink sub-frames is a first number as a link direction configuration for wireless communication of the first frequency channel, and selects a second link direction configuration of which the number of downlink sub-frames is a second number that is smaller than the first number as a link direction configuration for wireless communication of the second frequency channel.

12. The communication control device according to claim 5, wherein, when the distance between an interference frequency channel on which an interference signal is transmitted and each of the frequency channels in a frequency direction is shorter than a third distance, the selection unit selects the link direction configuration dedicated to a downlink as a link direction configuration for wireless communication of each of the frequency channels.

13. The communication control device according to claim 1,
wherein the one or more frequency channels include a frequency channel that is a fourth distance or more apart from an interference frequency channel on which an interference signal is transmitted in a frequency direction.

14. The communication control device according to claim 6,
wherein the wireless communication is wireless communication of the secondary system that secondarily uses a frequency channel for a primary system, and
wherein the interference frequency channel is a frequency channel that is used in another wireless communication system different from the secondary system.

15. The communication control device according to claim 6,
wherein the wireless communication is wireless communication of a small cell which is partly or entirely overlapped by a macro cell, and
wherein the interference frequency channel is a frequency channel that is used in the macro cell.

16. A communication control method for controlling wireless communication in a wireless communication system that includes a primary system and a secondary system, the communication control method comprising:
recognizing with a recognition unit a frequency channel on which wireless communication is performed in compliance with a time division duplex (TDD) scheme;
selecting a link direction configuration for the wireless communication among a plurality of candidates for the link direction configuration, each of the plurality of the candidates indicates a link direction in units of a sub-frame of a radio frame; and
applying the selected link direction configuration to the wireless communication,
wherein the wireless communication is performed on one or more frequency channels of the secondary system, the one or more frequency channels including a first frequency channel that is usable for machine-to-machine communication, and
when the wireless communication is for the machine-to-machine communication, the selecting includes selecting a link direction configuration of which the number of uplink sub-frames is greater than a predetermined number as a link direction configuration for the first frequency channel.

17. A communication control device that controls wireless communication in a wireless communication system that includes a primary system and a secondary system, the communication control device comprising:
a recognition unit configured to recognize a frequency channel on which wireless communication is performed in compliance with a time division duplex (TDD) scheme; and
a decision unit configured to, when the wireless communication is performed on two or more frequency channels, decide one or more link direction configuration candidates selectable among a plurality of link direction configuration candidates to be applied to wireless communication of each of the two or more frequency channels, each of the plurality of candidates indicates a link direction in units of a sub-frame of a radio frame for each of the frequency channels included in the two or more frequency channels, on the basis of information relating to a distance between an interference frequency channel on which an interference signal is transmitted and each of the frequency channels in a frequency direction,
wherein the wireless communication is performed on one or more frequency channels of the secondary system, the one or more frequency channels including a first frequency channel that is usable for machine-to-machine communication, and
when the wireless communication is for the machine-to-machine communication, the decision unit is configured to select a link direction configuration of which the number of uplink sub-frames is greater than a predetermined number as a link direction configuration for the first frequency channel.

18. A communication device that controls wireless communication in a wireless communication system that includes a primary system and a secondary system, the communication device comprising:
a recognition unit configured to recognize a link direction configuration to be applied to the wireless communication in compliance with a time division duplex (TDD) scheme, the link direction configuration being recognized from among a plurality of link direction configuration candidates, each of the plurality of the candidates indicates a link direction in units of a sub-frame of a radio frame; and
a communication control unit configured to control the wireless communication in compliance with the recognized link direction configuration,
wherein the wireless communication is performed on one or more frequency channels of the secondary system, the one or more frequency channels including a first frequency channel that is usable for machine-to-machine communication, and
when the wireless communication is for the machine-to-machine communication, the recognition unit is configured to recognize a link direction configuration of which the number of uplink sub-frames is greater than a predetermined number as a link direction configuration for the first frequency channel.

* * * * *